US012722538B2

(12) United States Patent
Zhao et al.

(10) Patent No.: US 12,722,538 B2
(45) Date of Patent: Sep. 1, 2026

(54) LOOP LATCH RELEASE SYSTEM FOR A LONG RAIL ASSEMBLY

(71) Applicants: Kai Zhao, Novi, MI (US); Louis Vetere, II, Commerce Township, MI (US); Avery Folk, West Bloomfield, MI (US); Kristof M Kurzeja, Commerce Township, MI (US); Magna Seating Inc, Aurora (CA)

(72) Inventors: Kai Zhao, Novi, MI (US); Louis Vetere, II, Commerce Township, MI (US); Avery Folk, West Bloomfield, MI (US); Kristof M Kurzeja, Commerce Township, MI (US)

(73) Assignee: Magna Seating Inc., Aurora (CA)

( * ) Notice: Subject to any disclaimer, the term of this patent is extended or adjusted under 35 U.S.C. 154(b) by 705 days.

(21) Appl. No.: 18/246,536

(22) PCT Filed: Sep. 24, 2021

(86) PCT No.: PCT/US2021/051959
§ 371 (c)(1),
(2) Date: Mar. 24, 2023

(87) PCT Pub. No.: WO2022/067041
PCT Pub. Date: Mar. 31, 2022

(65) Prior Publication Data

US 2023/0391230 A1 Dec. 7, 2023

Related U.S. Application Data

(60) Provisional application No. 63/082,692, filed on Sep. 24, 2020.

(51) Int. Cl.

| | |
|---|---|
| ***B60N 2/06*** | (2006.01) |
| ***B60N 2/02*** | (2006.01) |
| ***B60N 2/08*** | (2006.01) |

(52) U.S. Cl.
CPC ......... *B60N 2/067* (2013.01); *B60N 2/02253* (2023.08); *B60N 2/0875* (2013.01)

(58) Field of Classification Search
CPC .. B60N 2/067; B60N 2/02253; B60N 2/0875; B60N 2/0705; B60N 2/0881; B60N 2/0806
See application file for complete search history.

(56) References Cited

U.S. PATENT DOCUMENTS 5,800,015 A 9/1998 Tsuchiya et al.
9,010,860 B2 * 4/2015 Kume ................ B60N 2/02246 297/344.1

(Continued)

FOREIGN PATENT DOCUMENTS

DE 19824038 7/1999
DE 20318787 U1 * 4/2005 ........... B60N 2/0881

(Continued)

*Primary Examiner* — Kimberly T Wood
(74) *Attorney, Agent, or Firm* — Miller Canfield

(57) ABSTRACT

A rail drive assembly having a loop latch and a loop latch release system is assembled with a fixed long rail for transposing a vehicle seat along the fixed long rail. The loop latch has spaced apart trigger releases and is repositionable between a locked position and an unlocked position. The loop latch release system includes a dual plunger, a rotatable actuator cam, and a return spring. The dual plunger has spaced apart plungers configured to engage with respective release triggers and is repositionable between a retracted position spaced apart from the loop latch and an extended position wherein the plungers engage with the release triggers and reposition the loop latch to the unlocked position. Rotation of the actuator cam repositions the dual plunger towards the extended position. The return spring biases the dual plunger towards the retracted position and towards an engaged position with the actuator cam.

16 Claims, 27 Drawing Sheets

(56) References Cited

U.S. PATENT DOCUMENTS

| | | | | |
|---|---|---|---|---|
| 9,033,299 | B2 * | 5/2015 | Kramm | B60N 2/0705 297/344.1 |
| 11,679,694 | B2 * | 6/2023 | Zhao | B60N 2/0875 248/429 |
| 12,043,142 | B2 * | 7/2024 | Zhao | B60N 2/067 |
| 2013/0162000 | A1 * | 6/2013 | Kume | B60N 2/062 297/463.1 |

FOREIGN PATENT DOCUMENTS

| | | | | |
|---|---|---|---|---|
| FR | 2882539 | A1 * | 9/2006 | B60N 2/0705 |
| FR | 2882703 | A1 * | 9/2006 | B60N 2/0875 |
| WO | 202013177 | | 6/2020 | |

* cited by examiner

Forward (F)
Rearward (R)
12
192
130
130B
14
154
162
134
A
C
B
358
350
32
354
354A
4
266
266A
266B
292
278
260A
260
28
286
84
144B
94
150
130A
98
144A
76
68
104
90
72
158
168
110
22

12
130
294
22
28, 180
292
292A
292B
286D
286'
286E
448, 512
444
452A
366F
366B
366D
32, 340
366A
374
350, 380
378
354B
354
354A
370
366C
366
452
358, 384
362
440, 512
514
310
286B
286
286A
286C
286F
260A
266
266B
266A
14

12
22
260A
268A
293
272C
268, 268D
268E
272B
268B
272
266E
278B
268C
278
272A
296
266, 266D
118B
144B
14
286E
312A
518
130
278D
266B
286F
266A
298, 298'
260
144B'
298''
286C
302
294
300A
440, 512
358
514
310A
286, 286'
278C, 278A
286A
28, 180

32, 340
388B
408, 388
404
458
452, 452A
452B
454
448
504
508
366E
366F
28, 180
314B
310, 310B
312B
294
22
400
362
504A
314A
444B
414D
414C
420
418
508A
444A
444
390
314B
312A
414A
414B
388A
460
354, 354A
350, 380
366C
440
366
504
508
310, 310A
314A
358, 384
286, 180

32
350
354A
354B
374
378
370
370B
354
370A
388
476
468
390
460
366A
300A
504A
472
452A
468
458
452
358
366F
362
444
366B
366
366E 32P
130P
28P
286P
538
504P
534P, 534P'
354P
536P
532P
358P
530P
350P
544P
540P
546P
366P
538P
144B
22

12
14
22
318
292
28, 180
268E
278, 278C
296
118A
316A
316
266E
366
516
516A
350, 380A
388
370
366K
358A
452
358, 384B
366H
130
318A
440
310A
286, 180
514
354A
32, 340B

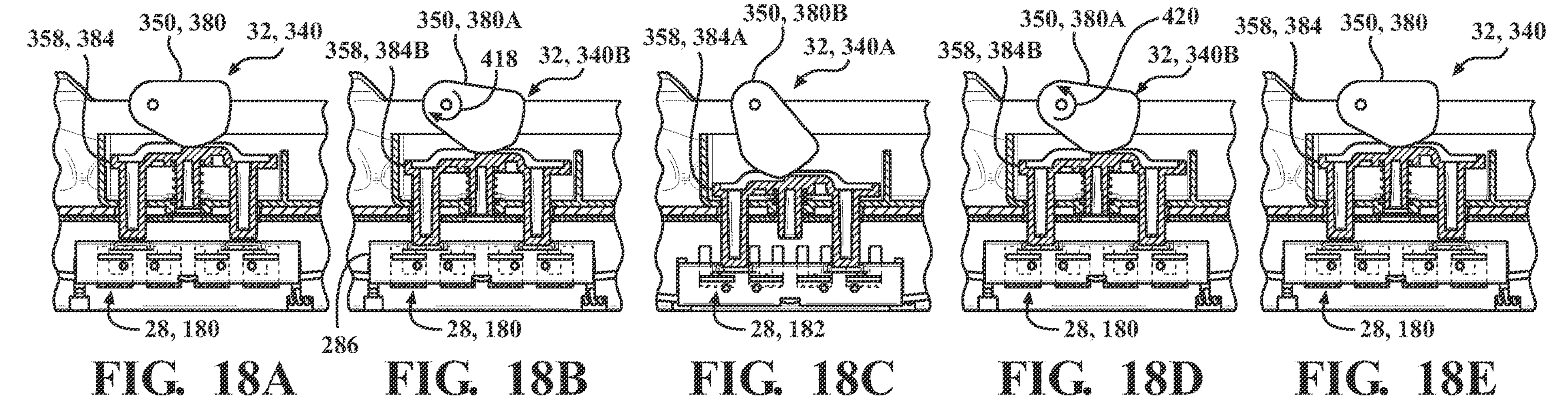
358, 384
350, 380
32, 340
28, 180
FIG. 18A
350, 380A
358, 384B
418
32, 340B
286
28, 180
FIG. 18B
350, 380B
358, 384A
32, 340A
28, 182
FIG. 18C
350, 380A
420
358, 384B
32, 340B
28, 180
FIG. 18D
358, 384
350, 380
32, 340
28, 180
FIG. 18E
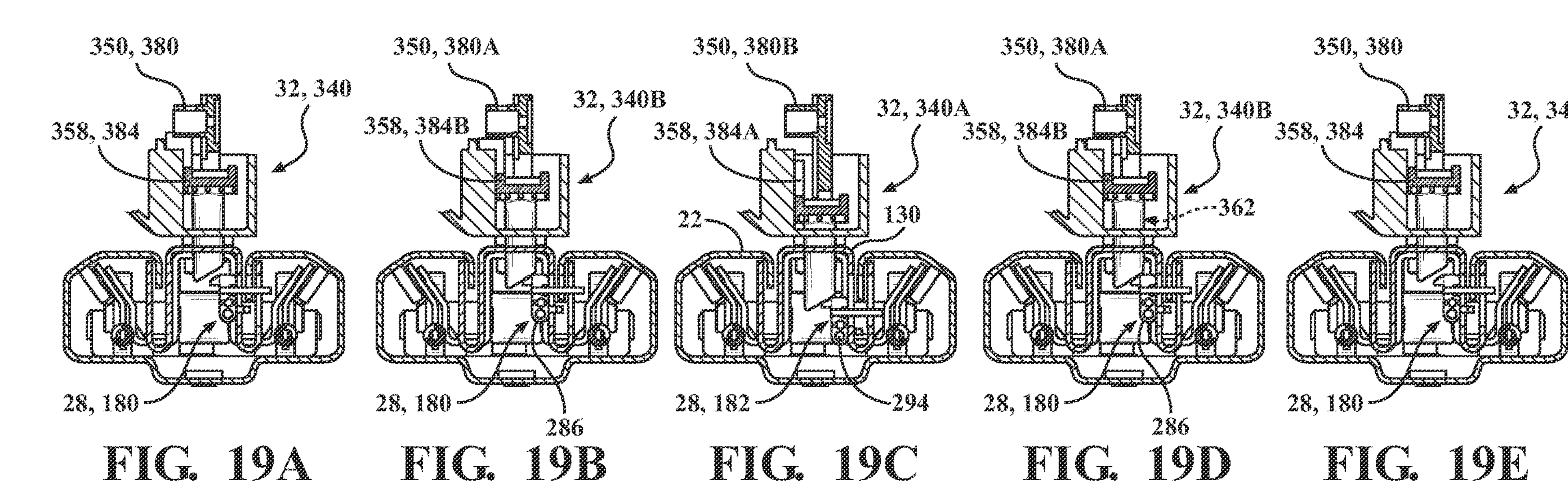
350, 380
32, 340
358, 384
28, 180
FIG. 19A
350, 380A
32, 340B
358, 384B
28, 180
286
FIG. 19B
350, 380B
32, 340A
358, 384A
22
130
28, 182
294
FIG. 19C
350, 380A
32, 340B
358, 384B
362
28, 180
286
FIG. 19D
350, 380
32, 340
358, 384
28, 180
FIG. 19E 12
32'
14
22
278
286E
28
130C
508
310B
310A
286
292
294
130
514
452E
444
452D
448
358
452
610B
638
388
350
350B
600
600F
600H'
600L
600G
362B
362
362A
600D
600K
600H
600C
600B
600E
600J
618
620
630
634
610A
640
440

362
362A
444
444C
452A
452
32', 340
358, 384
440
130
508
514A
514
286E
118A
278C
22
292
272
268, 268E
268D
270
294
310A, 312A
286, 180
28, 180
318

362
444, 444C
118A
278C
22
270
272
268, 268E
292
268D
514
266D
294
28, 182
286, 182
266, 266E
310A, 312A
514A
318
440
130
358, 384A
452
452A
32', 340A

LOOP LATCH RELEASE SYSTEM FOR A LONG RAIL ASSEMBLY

CROSS-REFERENCE TO RELATED APPLICATIONS

This application claims priority to U.S. Provisional Application 63/082,692, filed on Sep. 24, 2020, the disclosure of which is hereby incorporated by reference in its entirety.

BACKGROUND OF THE INVENTION

1. Field of the Invention

The present invention relates to a long rail assembly that supports a vehicle seat within an automotive vehicle and is configured to travel along a fixed long rail when the vehicle seat is repositioned to another location along the fixed long rail. More particularly, the invention relates to a loop latch release system for the long rail assembly configured to automatically unlock a loop latch coupling the long rail assembly to the fixed long rail.

2. Description of Related Art

Various slide mechanisms are known for repositioning a vehicle seat along a fixed long rail in a vehicle. An example of a known slide mechanism having a loop latch release mechanism is disclosed in PCT publication WO/2020/131777 wherein a vehicle seat is coupled to a slide mechanism that is slidable within a fixed long rail. The slide mechanism includes a movable upper channel having rollers configured to travel along the fixed long rail. A loop latch releasably couples the movable upper channel with the fixed long rail. The loop latch typically includes metal fingers and/or wire loops operatively coupled to the movable upper channel and repositionable between an unlocked position and a locked position engaged with slots, holes, and/or notches in the fixed long rail. A loop latch release mechanism is operatively connected to the loop latch. The loop latch release mechanism is configured to reposition the loop latch between the locked position and the unlocked position. The loop latch release mechanism comprises a latch motor rotationally coupled to an actuator cam. The actuator cam includes a cam slot having a cam surface. A release plunger is directly coupled to the cam slot by a rivet extending through the cam slot. The release plunger is configured to releasably engage with the loop latch when the release plunger is moved towards the loop latch. Rotation of the actuator cam by the latch motor causes the release plunger to press on a retainer of the loop latch and results in the loop latch being repositioned to the unlocked position. Once the loop latch is in the unlocked position, the vehicle seat can be repositioned to another location along the fixed long rail. When the vehicle seat is in a desired location, the latch motor rotates the actuator cam back to a home rotational position which retracts the release plunger away from the loop latch. The loop latch automatically moves back to the locked position.

This known loop latch release mechanism requires a specific alignment of the actuator cam and the release plunger since the release plunger is directly coupled to the cam slot in the actuator cam. Further, this known loop latch release mechanism has only a single contact point between the release plunger and the retainer of the loop latch which can result in rotation of the loop latch when the loop latch is being repositioned to the unlocked position. Finally, misalignment of the release plunger, the actuator cam, and the retainer of the loop latch can negatively affect the function of the loop latch release mechanism.

It is desirable, therefore, to have a loop latch release system that eliminates the direct coupling between the actuator cam and the release plunger. Further, it is desirable for the loop latch release system to have more than a single contact point between the release plunger and the loop latch to reduce rotation of the loop latch due to the engagement with the release plunger. Finally, it is desirable to accommodate an amount of component misalignment, tolerance stackup, and component dimensional variation while assuring proper functioning of the loop latch release system.

SUMMARY OF THE INVENTION

A rail drive assembly having a loop latch and a loop latch release system is provided for transposing a vehicle seat along a fixed long rail. The loop latch has spaced apart trigger releases and is repositionable between a locked position wherein the rail drive assembly is interlocked with the fixed long rail and an unlocked position wherein the rail drive assembly is transposable along the fixed long rail. The loop latch release system includes a dual plunger repositionable between a retracted position and an extended position and has spaced apart first and second plungers configured to frictionally engage with respective release triggers, a return spring biasing the dual plunger towards the retracted position and towards a engaged position with the actuator cam, and an actuator cam that is rotated to reposition the dual plunger towards the extended position.

BRIEF DESCRIPTION OF THE DRAWINGS

Advantages of the present invention will be readily appreciated as the same becomes better understood by reference to the following detailed description when considered in connection with the accompanying drawings wherein:

FIG. 18A shows a fragmentary cross-sectional view of the long rail assembly of FIG. 17, showing the loop latch release system in an unactuated condition with the loop latch in the locked position;

FIG. 18B shows a fragmentary cross-sectional view of the long rail assembly of FIG. 18A, showing the loop latch release system in a transition condition with the loop latch in the locked position;

FIG. 18C shows a fragmentary cross-sectional view of the long rail assembly of FIG. 18B, showing the loop latch release system in an actuated condition with the loop latch in the unlocked position;

FIG. 18D shows a fragmentary cross-sectional view of the long rail assembly of FIG. 18C, showing the loop latch release system in the transition condition with the loop latch in the locked position;

FIG. 18E shows a fragmentary cross-sectional view of the long rail assembly of FIG. 18D, showing the loop latch release system in the unactuated condition with the loop latch in the locked position;

FIG. 19A shows a cross-sectional end view of the long rail assembly of FIG. 18E, showing the loop latch release system in the unactuated condition with the loop latch in the locked position;

FIG. 19B shows a cross-sectional end view of the long rail assembly of FIG. 19A, showing the loop latch release system in the transition condition with the loop latch in the locked position;

FIG. 19C shows a cross-sectional end view of the long rail assembly of FIG. 19B, showing the loop latch release system in the actuated condition with the loop latch in the unlocked position;

FIG. 19D shows a cross-sectional end view of the long rail assembly of FIG. 19C, showing the loop latch release system in the transition condition with the loop latch in the locked position;

FIG. 19E shows a cross-sectional end view of the long rail assembly of FIG. 19D, showing the loop latch release system in the unactuated condition with the loop latch in the locked position;

DETAILED DESCRIPTION OF THE EMBODIMENTS

FIGS. 1-11 and 14-28 illustrate a long rail assembly 12 having a rail drive assembly 14 configured to transpose a vehicle seat 18 for an automotive vehicle along a fixed long rail 22 for seat position adjustment according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
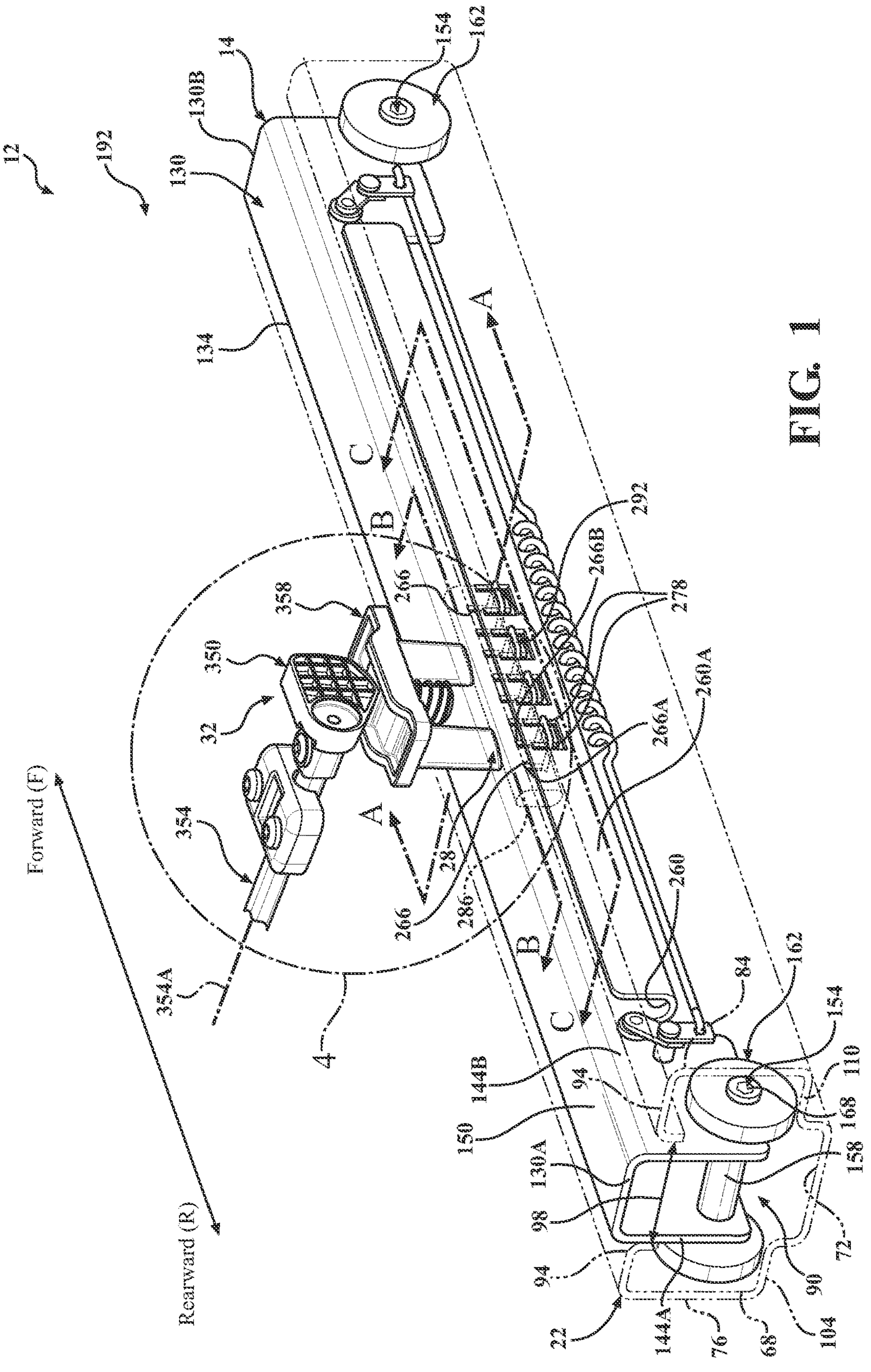
FIG. 1 is a cutaway perspective view of a long rail assembly including a rail drive assembly having a loop latch and a loop latch release system, according to one embodiment of the present invention.

FIG. 1 illustrates a long rail assembly 12 having a rail drive assembly 14 for adjusting the position of a vehicle seat 18 (shown in FIG. 2) along a fixed long rail 22 within an automotive vehicle, according to one embodiment of the present invention. The rail drive assembly 14 includes a loop latch 28 to interlock the rail drive assembly 14 to the fixed long rail 22. A loop latch release system 32 is operatively coupled to the loop latch 28 and configured to automatically disengage the loop latch 28 from the fixed long rail 22 in order to unlock the rail drive assembly 14. The rail drive assembly 14 is transposable along the fixed long rail 22 when the rail drive assembly 14 is unlocked. In certain embodiments, the rail drive assembly 14 is a power rail drive assembly 14 configured to be automatically repositioned along the fixed long rail 22. In other embodiments, the rail drive assembly 14 is a manual rail drive assembly configured to be manually repositioned along the fixed long rail 22.

Figure 2:
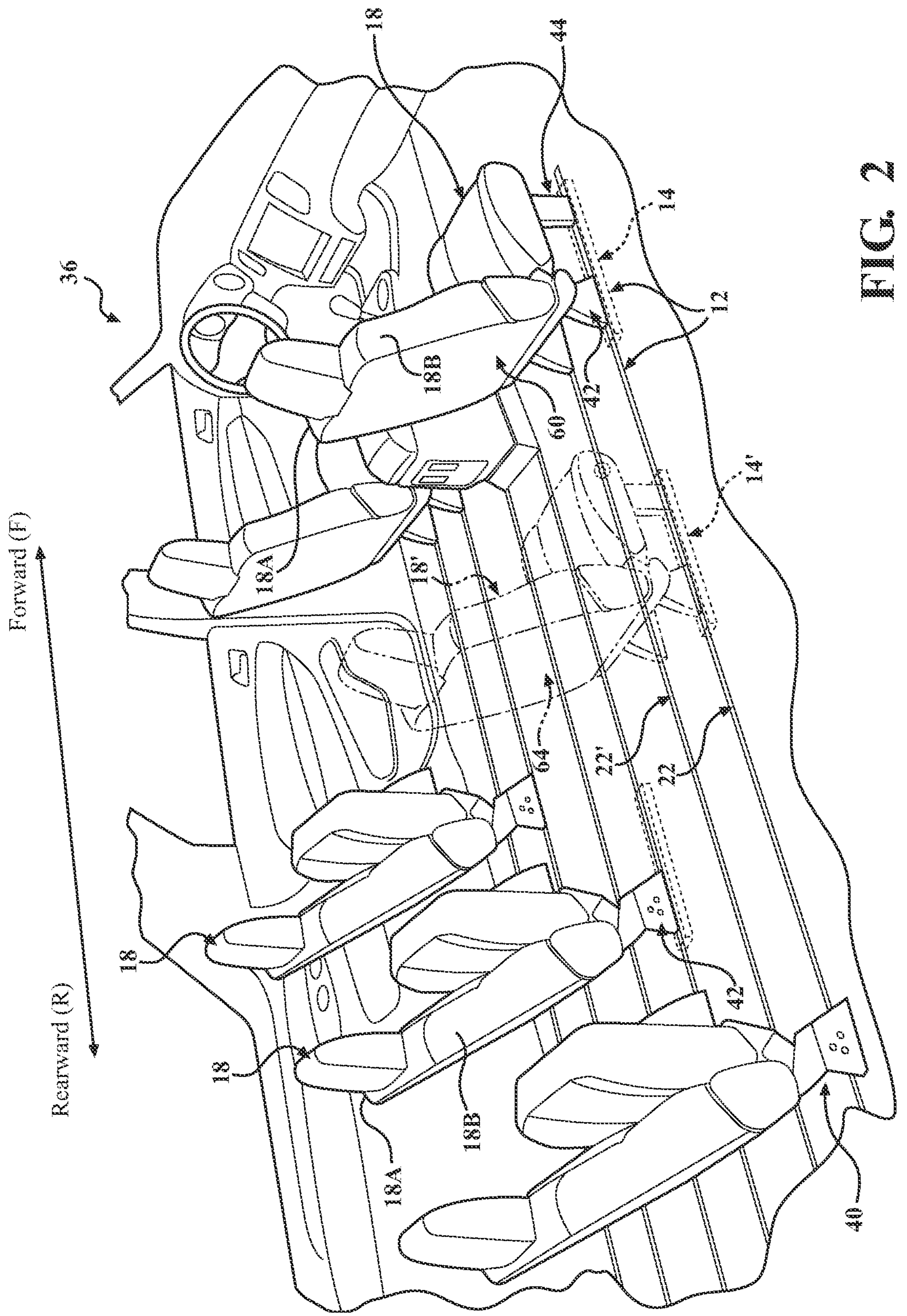
FIG. 2 is a perspective view of an interior of a vehicle having vehicle seats coupled to long rail assemblies, according to one embodiment of the present invention.

FIG. 2 shows an interior 36 of an automotive vehicle having a plurality of vehicle seats 18. Each vehicle seat 18 is connected by a rail drive assembly 14 to the fixed long rails 22, 22' which extend longitudinally along a vehicle floor 40. Each vehicle seat 18 is supported by at least one leg 42 on opposing sides 18A, 18B of the vehicle seat 18, and optionally rear and front legs 42, 44 on the opposing sides 18A, 18B of the vehicle seat 18. The legs 42, 44 are removably coupled to the rail drive assembly 14 by any method commonly known in the art, such as by a striker and latch mechanism.

Referring to FIG. 2, each rail drive assembly 14 travels along one of the fixed long rails 22, 22' attached to the vehicle floor 40 in the fore direction F ("forward direction") and the aft direction R ("rearward direction"). Each vehicle seat 18 is mounted to at least one a rail drive assembly 14. Further, each vehicle seat 18 travels along a pair of the fixed long rails 22, 22' when the vehicle seat 18 is repositioned between a first vehicle seat location 60 and a second vehicle seat location 64 (shown in phantom as a vehicle seat 18' attached to a rail drive assembly 14'). The fixed long rails 22, 22' can extend for any length suitable for an intended application. Likewise, any suitable number of fixed long rails 22, 22' can be positioned on the vehicle floor 40 as desired for an intended application. Thus, the long rail assembly 12 allows for improved vehicle seat 18 position adjustment since the vehicle seat 18 is coupled to at least one rail drive assembly 14 that is repositionable to any vehicle seat position 60, 64 along the at least one fixed long rail 22.

Figure 3:
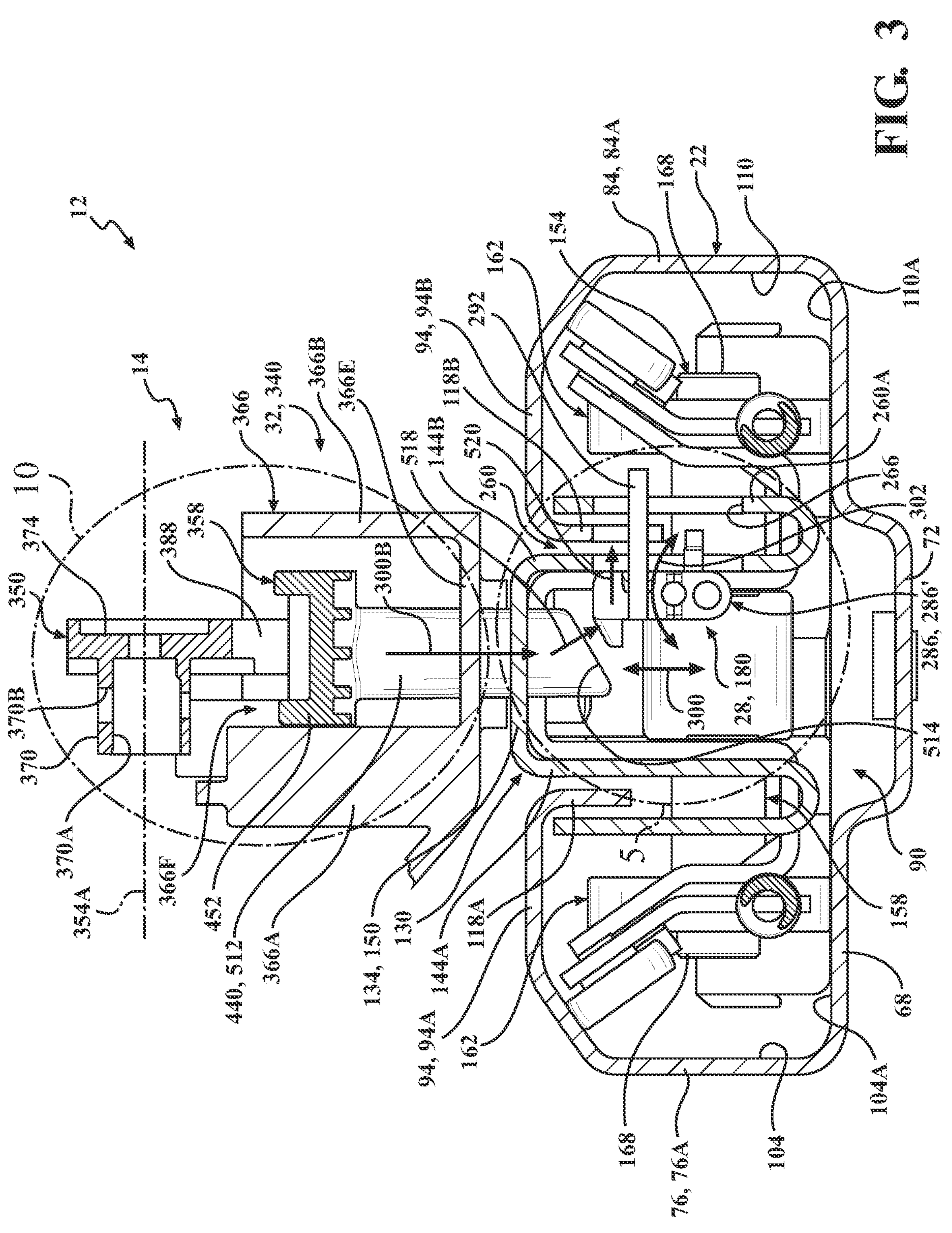
FIG. 3 is a cross-sectional end view of the long rail assembly of FIG. 1 taken along section line A-A of FIG. 1, showing the loop latch release system in a retracted position and the loop latch in an unlocked position.

As shown in FIG. 1, the fixed long rail 22 has a generally U-shaped cross-sectional profile 68, a bottom wall 72, opposing side walls 76, 84, an interior channel 90, and a top wall 94 having an elongated opening 98 extending in a longitudinal direction of the fixed long rail 22. Referring to FIG. 3, each side wall 76, 84 of the fixed long rail 22 optionally includes a track 104, 110 having a generally C-shaped cross-sectional profile with each track 104, 110 having a track bottom wall 104A, 110A, a track outer side wall 76A, 84A, a track top wall 94A, 94B, and a retaining lip 118A, 118B extending downward from the adjacent track top wall 94A, 94B and spaced apart from the adjacent track outer side wall 76A, 84A. As illustrated in FIG. 3, each track bottom wall 104A, 110A is optionally positioned above the bottom wall 72 of the fixed long rail 22. The fixed long rail 22 is a stamped, formed, molded, and/or rolled section of a metal or plastic material and having a length selected based on a specific application. It should be appreciated that the size, shape, and length of the fixed long rail 22 may vary without altering the scope of the invention.

Also shown in FIGS. 1 and 3, the rail drive assembly 14 includes an elongated upper channel 130 having a generally inverted U-shaped cross-sectional profile 134 and extending in a longitudinal direction between opposing ends 130A, 130B, opposing first and second side walls 144A, 144B and a top wall 150 extending between the opposing first and second side walls 144A, 144B. An axle 154 extends laterally through a hollow tube 158 extending between the opposing side walls 144A, 144B. A wheel 162 is fixedly coupled to the axle 154 near each end 168 of the axle 154. The rail drive assembly 14 shown in the embodiment of FIG. 1 includes a pair of wheels 162 adjacent to opposing ends 130A, 130B of the upper channel 130.

While not shown in the Figures, the wheels 162 can be replaced with rollers and/or glides. Any number and/or combination of wheels 162, rollers, and/or glides may be used as suitable for an intended application. Further, each wheel 162 or roller can be rotationally attached to the upper channel 130 using a shaft fixedly coupled to one of the side walls 144A, 144B of the upper channel 130 instead of the axle 154 extending through the upper channel 130. Alternatively, one or more wheels 162 can be attached to a bracket that is further attached to the upper channel 130.

Further details and alternate embodiments of an exemplary rail drive assembly 14 and fixed long rail 22 are more fully described in PCT Application No. PCT/US2019/55835, filed Oct. 11, 2019, which is hereby incorporated herein by reference in its entirety.

The loop latch 28 is integrated with the rail drive assembly 14, as shown in FIG. 1. The loop latch 28 interlocks the rail drive assembly 14 with the fixed long rail 22 so that the vehicle seat 18 is retained in any one of its seat positions 60, 64 during use and system loading events.

Figure 4:
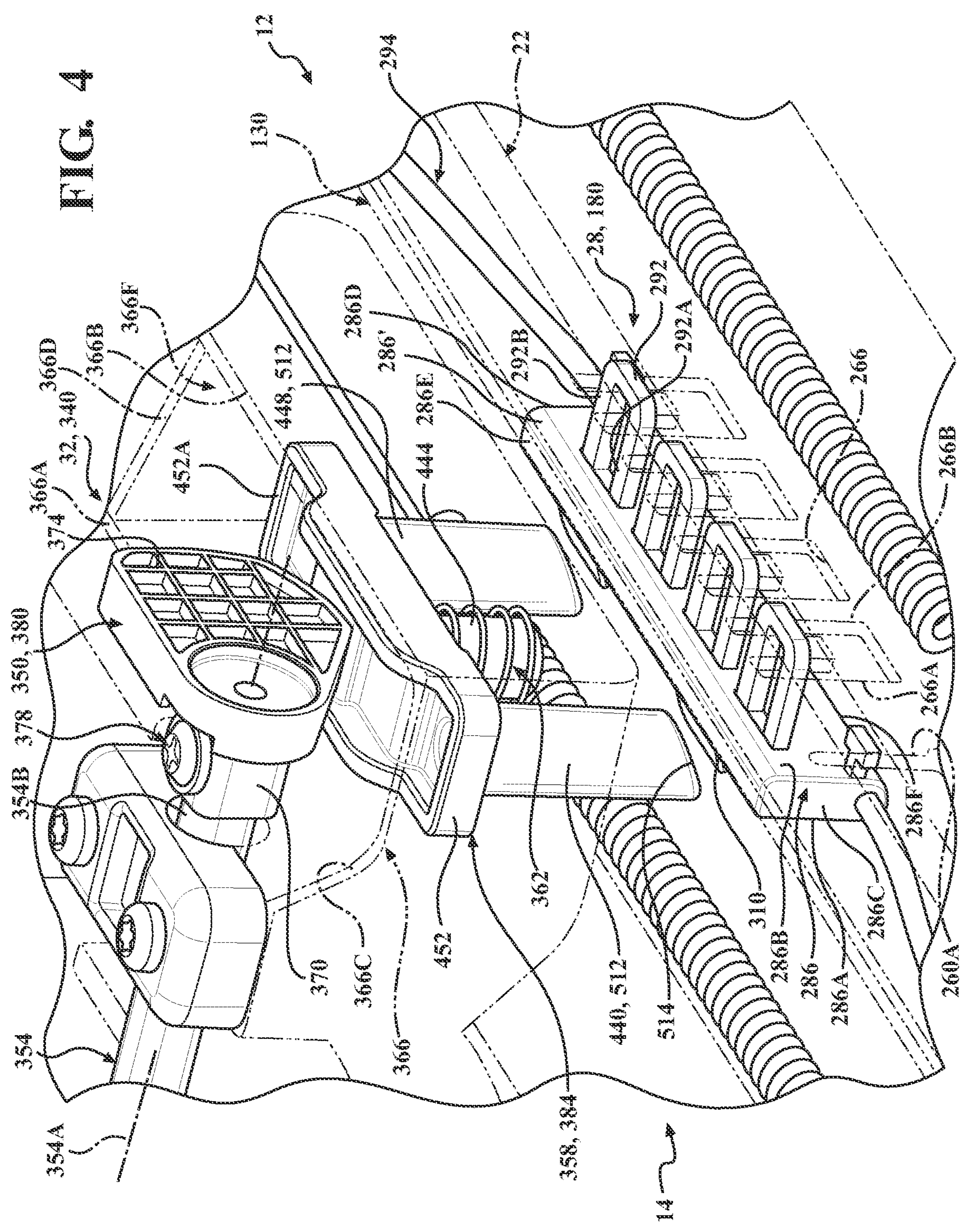
FIG. 4 is an enlarged fragmentary perspective view of portion 4 of FIG. 1, showing a dual plunger of the loop latch release system in the retracted position with the loop latch in a locked position.
Figure 5:
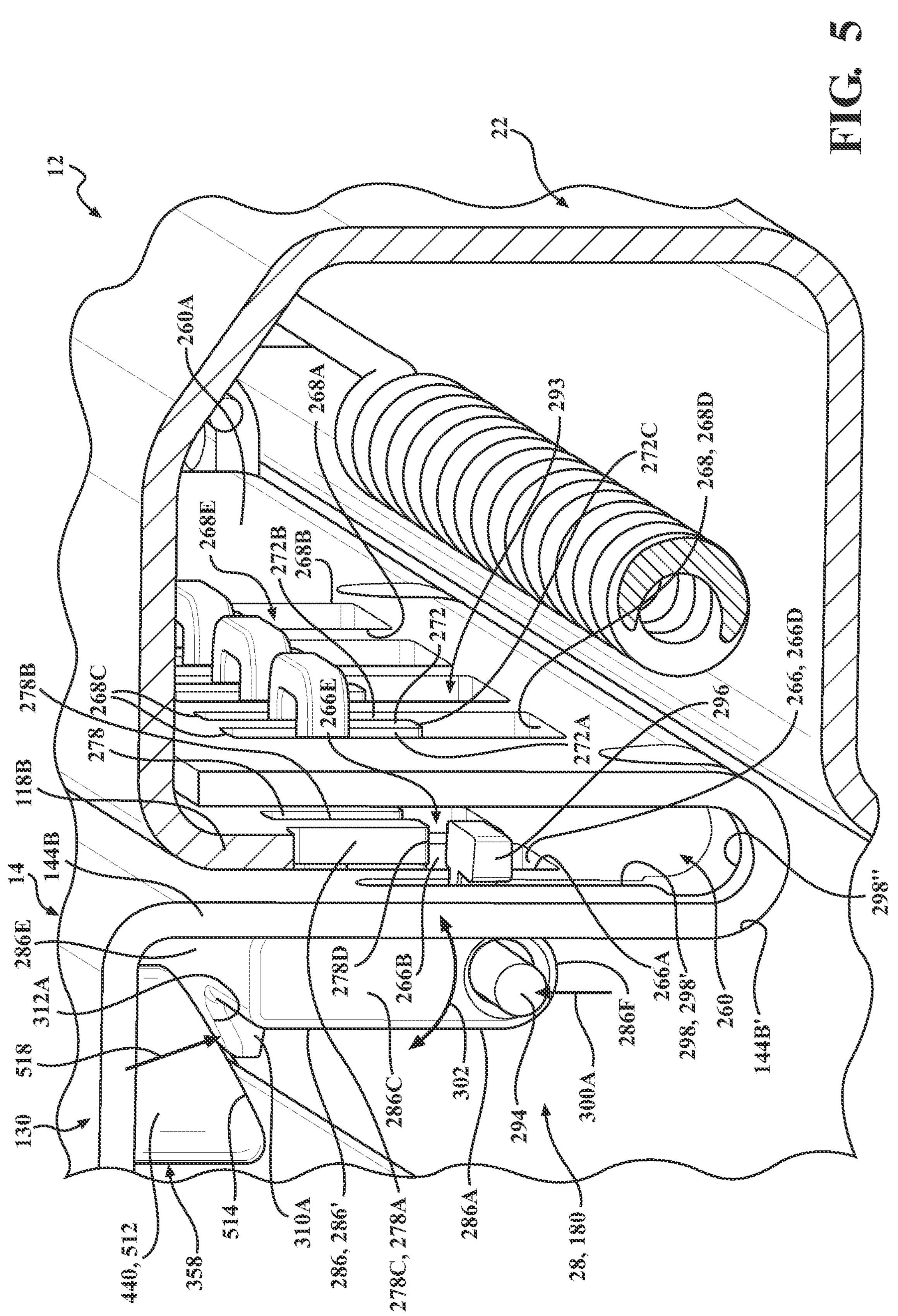
FIG. 5 is a fragmentary perspective view of portion 5 of FIG. 3, showing the loop latch in the locked position with the dual plunger in an initial contact position.
Figure 6:
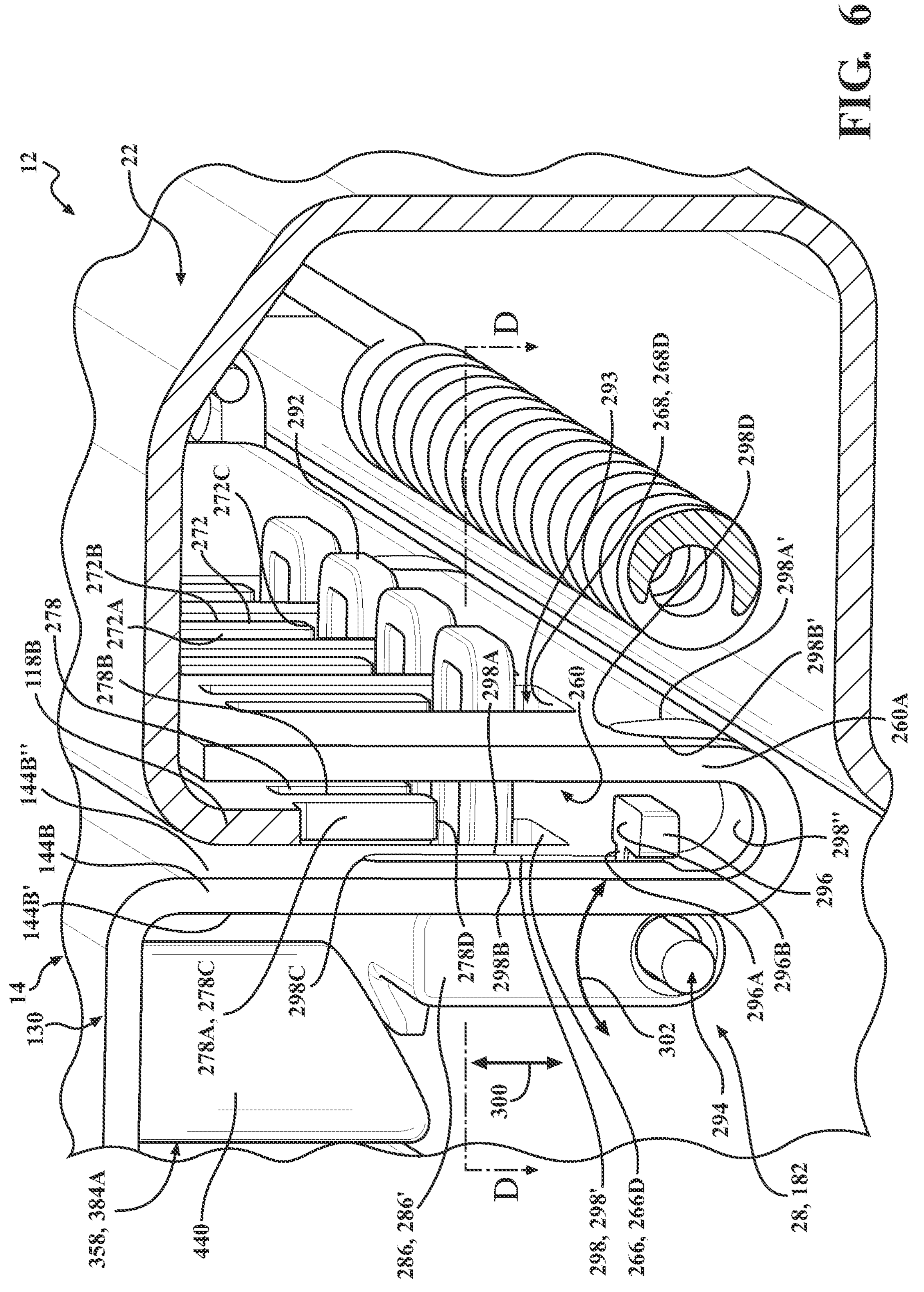
FIG. 6 is a fragmentary perspective view of FIG. 5, showing the loop latch in the unlocked position with the dual plunger in an extended position.

An enlarged fragmentary view of portion 4 in FIG. 1 is shown in FIG. 4 illustrating the loop latch 28, the loop latch release system 32, a portion of the upper channel 130 of the rail drive assembly 14, and a portion of the fixed long rail 22. FIG. 3 shows a cross-sectional end view of the loop latch release system 32 and the loop latch 28. FIGS. 5 and 6 show fragmentary perspective views of portion 5 of FIG. 3, illustrating the loop latch 28 in a locked position 180 and an unlocked position 182, respectively.

Figure 7:
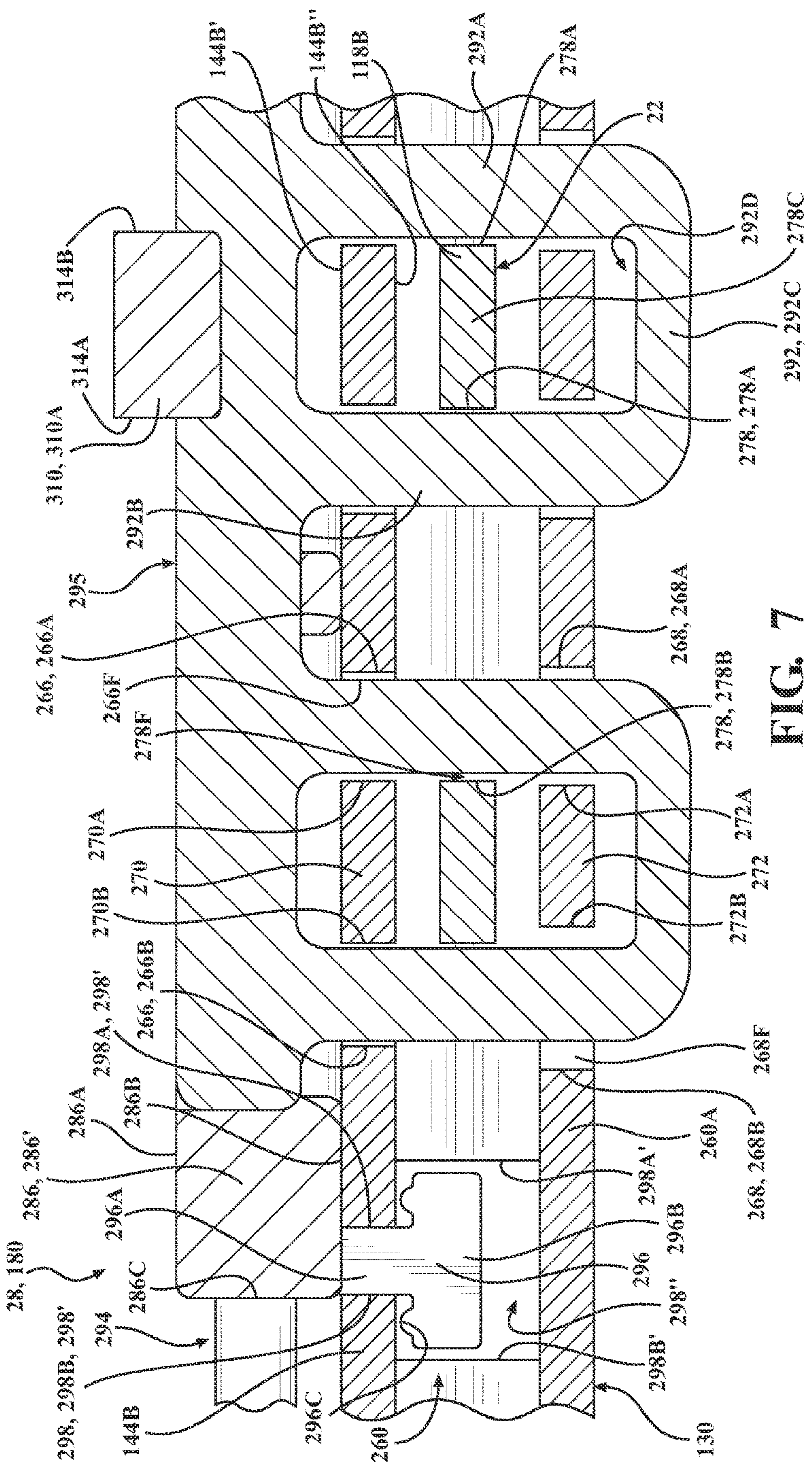
FIG. 7 is a cross-sectional view of a portion of the loop latch, the upper channel, and the fixed long rail of FIG. 6 taken along section line D-D of FIG. 6, showing loops of the loop latch and locking tabs in the upper channel and in the fixed long rail.

In the embodiment shown in FIG. 5, a portion 260A of the side wall 144A, 144B of the upper channel 130 is bent upward to form an outer channel wall 260A spaced apart from the side wall 144A, 144B and defining a generally U-shaped channel(s) 260 therebetween. A first plurality of generally U-shaped slots 266 are arranged in the side wall 144A, 144B of the upper channel 130 and spaced apart in the longitudinal direction of the upper channel 130. A second plurality of U-shaped slots 268 are formed in the outer channel wall 260A and are aligned with the first plurality of generally U-shaped slots 266 in the side wall 144A, 144B. The first and second plurality of U-shaped slots 266, 268 are more clearly shown in FIG. 7. Referring to FIG. 7, each of the first and second plurality of U-shaped slots 266, 268 includes opposing outer side walls 266A, 266B, 268A, 268B extending between opposing upper and lower end surfaces 266D, 268C, 268D (shown in FIG. 5). A locking tab 270, 272 extends vertically downward from the upper end surface 268C of each of the first and second plurality of U-shaped slots 266, 268. The locking tabs 270, 272 include opposing side walls 270A, 270B, 272A, 272B extending between the respective upper end surface 268C and an end surface 272C of the locking tab 270, 272. The end surfaces 272C of the locking tabs 270, 272 are spaced apart from the respective lower end surface 266D, 268D of the U-shaped slots 266, 268, defining a gap 266E, 268E therebetween (see FIG. 5).

As shown in FIGS. 5 and 7, vertical slots 278 are spaced along the longitudinal length of the retaining lip 118A, 118B of the fixed long rail 22. Alternatively, the vertical slots 278 can be replaced by notches and/or holes as desired for a specific application and latch configuration. The vertical slots 278 have opposing side walls 278A, 278B (see FIG. 7). FIG. 7 shows a fragmentary cross-sectional view of a portion of the loop latch 28 and the upper channel 130 taken along section line D-D of FIG. 6 illustrating the alignment of the first and second U-shaped slots 266, 268, the locking tabs 270, 272, and the vertical slots 278 in the retaining lip 118A, 118B. Each retaining lip 118A, 118B portion 278C extending between the adjacent side walls 278A, 278B of each of the vertical slots 278 forms a locking tab 278C in the retaining lip 118A, 118B, as illustrated in FIG. 7.

Referring to FIGS. 3, 5, and 7, the loop latch 28 includes a latch retainer 286 having an elongated main portion 286' with a plurality of generally U-shaped loops 292 extending therefrom. As best shown in FIG. 7, the U-shaped loops 292 have opposing loop side portions 292A, 292B extending laterally away from the latch retainer 286 with a loop end portion 292C extending between the opposing loop side portions 292A, 292B. The loop side portions 292A, 292B extending away from the latch retainer 286 in combination with the loop end portion 292C define a loop cavity 292D therebetween. The loop side portions 292A, 292B are sized and shaped to pass through a gap 266F, 268F, 278F between adjacent locking tabs 270, 272, 278C in the side wall 144A, 144B, in the outer channel wall 260A, and in the retaining lip 118A, 118B, respectively. In addition, the U-shaped loops 292 are sized and shaped such that the loop side portions 292A, 292B are spaced farther apart than the width of the locking tabs 270, 272, 278C. When the loop latch 28 is in the locked position 180 shown in FIG. 5, the locking tabs 270, 272, 278C extend downward within the respective loop cavity 292D. When the loop latch 28 is in the unlocked position 182 shown in FIG. 6, the U-shaped loops 292 are positioned in a gap 293 between the end surfaces 272C, 278D of the locking tabs 270, 272, 278C and the lower end surface 266D, 268D of the U-shaped slots 266, 268.

The loop latch 28 is operatively coupled to a spring 294 to spring-bias the loop latch 28 upward, as illustrated by arrow 300A, towards the locked position 180 shown in FIG. 5. The spring 294 assures that the loop latch 28 returns to the locked position 180 when the loop latch release system 32 is not actively disengaging the loop latch 28.

In the embodiment shown in FIG. 7, the U-shaped loops 292 are part of a loop member 295 that is assembled with the latch retainer 286. Alternatively, the loop member 295 is insert molded within the latch retainer 286 and/or integrally formed with the latch retainer 286. Further, the loop member 295 is preferably formed of a metal material. However, it is understood that in certain embodiments, the loop member 295 can be formed of a plastic material and/or combinations of metal and plastic, and may include other materials. In addition, the latch retainer 286 is formed out of a plastic material, a metal material, and/or combinations thereof. The embodiment shown in FIG. 4 includes four U-shaped loops 292 extending from the latch retainer 286, however, any suitable number of loops 292 may be used without altering the scope of the invention. Optionally, the loops 292 can be replaced by one or more fingers, a plate, pins, and/or the like.

Referring to FIGS. 4, the elongated main portion 286' of the latch retainer 286 has opposing generally vertical side surfaces 286A, 286B extending between opposing generally vertical end surfaces 286C, 286D and generally horizontal opposing top and bottom surfaces 286E, 286F. It will be understood that the latch retainer 286 can have alternate shapes, including non-rectangular shapes, and can include more or less features and surfaces as desired for specific applications. For example, the bottom surface 286F of the latch retainer 286 has a generally arcuate-shape in the embodiment shown in FIG. 5. As illustrated in FIG. 7, at least a portion of the side surface 286B abutting an inner surface 144B' of the upper channel 130 side wall 144B is preferably sized and shaped to matingly engage with at least a portion of the inner surface 144B' such that the latch retainer 286 will travel vertically along the side wall 144B. Alternatively, the latch retainer 286 main portion 286' is sized and shaped such that the latch retainer 286 can be repositioned vertically near and/or adjacent one of the side walls 144A, 144B of the upper channel 130.

In the embodiment shown in FIGS. 5 and 7, the latch retainer 286 is operatively coupled to the upper channel 130. In order to guide the motion of the latch retainer 286 along the inner surface 144B' of the upper channel 130, a T-shaped protrusion 296 projects from the side surface 286B (shown in FIG. 7) of the latch retainer 286. As viewed in FIG. 7, the T-shaped protrusion 296 includes a base portion 296A projecting from the side surface 286B of the latch retainer 286. A head portion 296B projects at an angle from the base portion 296A, forming the "T" shape. Optionally, extending from the head portion 296B are one or more bump 296C configured to glide along an outer surface 144B" of the upper channel 130 side wall 144B.

Referring to FIGS. 6 and 7, the upper channel 130 includes a guide slot 298 defined between opposing guide slot side surfaces 298A, 298A', 298B, 298B' extending between opposing inner and outer surfaces 144B', 144B" of the side wall 144B. The guide slot 298 includes a first guide slot end wall 298C (shown in FIG. 6) positioned on the side wall 144B and extending between the opposing guide slot side surfaces 298A, 298B. A second guide slot end wall 298D (shown in FIG. 6) is positioned on the outer channel wall 260A and also extends between the opposing guide slot side surfaces 298A', 298B'. The guide slot 298 includes a first portion 298' sized and shaped such that the base portion 296A of the T-shaped protrusion 296 can slide along the first portion 298' of the guide slot 298 while preventing the head portion 296B from passing through the guide slot 298. In addition, the guide slot 298 includes a second portion 298" that extends between the upper channel 130 side wall 144B and the outer channel wall 260A. The second portion 298" of the guide slot 298 is sized and shaped to allow the head portion 296B of the T-shaped protrusion 296 to pass through the second portion 298" of the guide slot 298 and into the U-shaped channel 260 between the side wall 144B and the outer channel wall 260A. Thus, the second portion 298" of the guide slot 298 aids in assembly of the latch retainer 286 with the upper channel 130.

Referring to FIG. 6, the main portion 286' of the latch retainer 286 is positioned adjacent the inner surface 144B' of the side wall 144B, the base portion 296A of the T-shaped protrusion 296 passes through the guide slot 298, and the head portion 296B of the T-shaped protrusion 296 is positioned adjacent the outer surface 144B" of the side wall 144B. The guide slot 298 in combination with the T-shaped protrusion 296 projecting from the latch retainer 286 guides the vertical motion (arrow 300 shown in FIG. 6) of the latch retainer 286 while limiting rotational motion (arrow 302 shown in FIG. 6) of the latch retainer 286 away from the side wall 144B of the upper channel 130.

Figure 8:
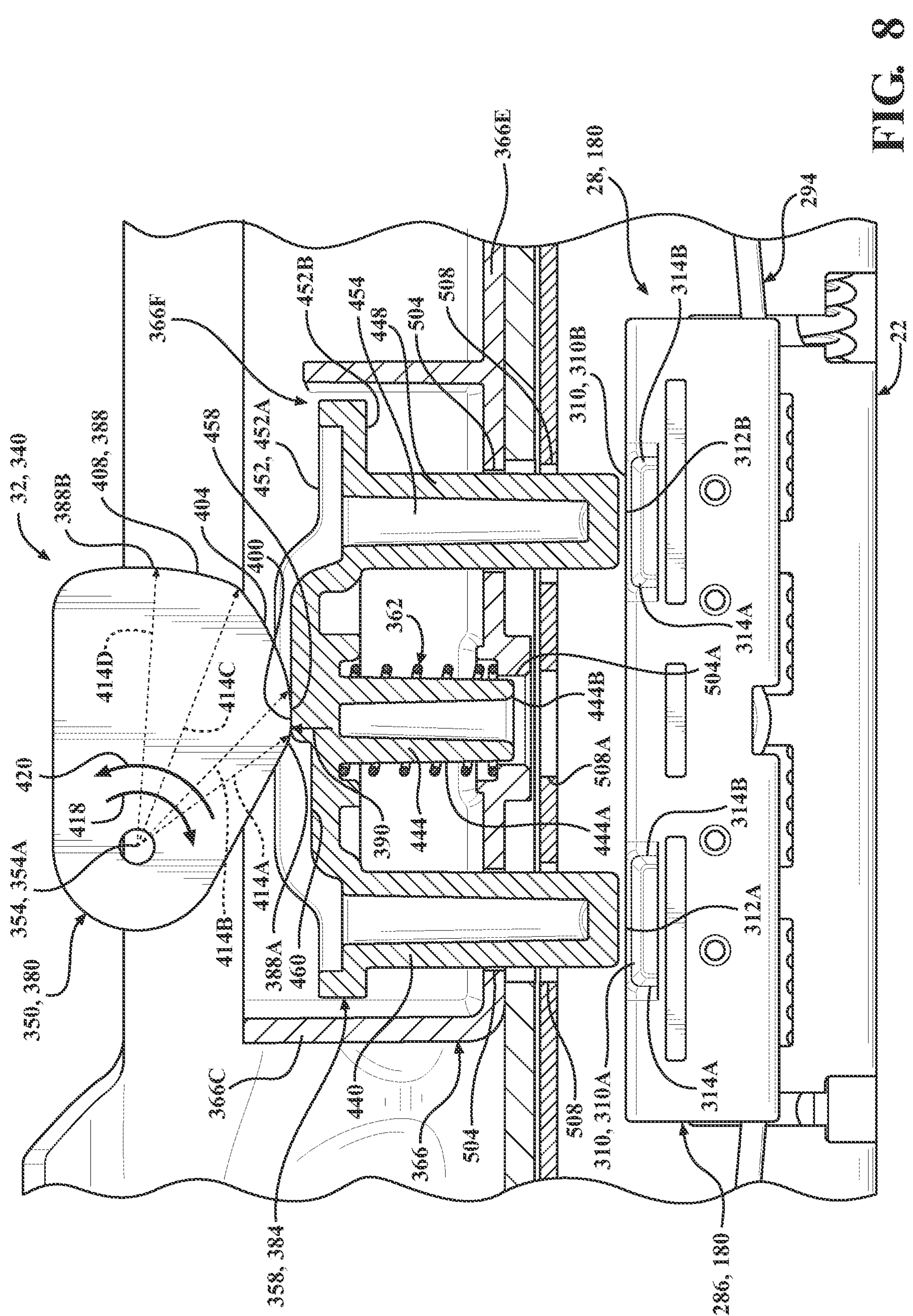
FIG. 8 is a fragmentary cross-sectional view of the long rail assembly of FIG. 1 taken along section line B-B of FIG. 1, illustrating the loop latch release system in an unactuated condition.
Figure 9:
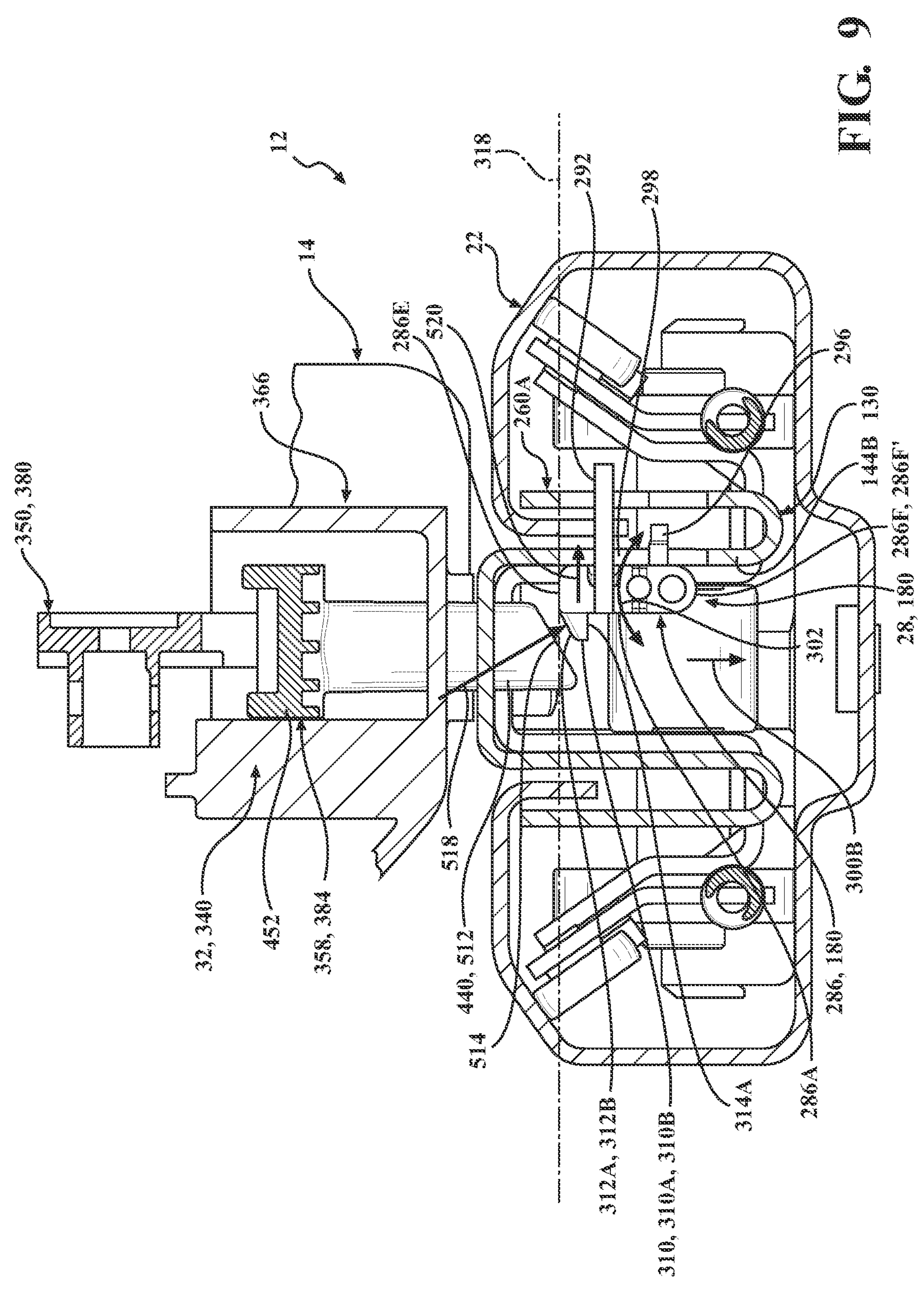
FIG. 9 is a cross-sectional end view of the long rail assembly of FIG. 3, showing the loop latch release system in the unactuated condition and the loop latch in the locked position.
Figure 24:
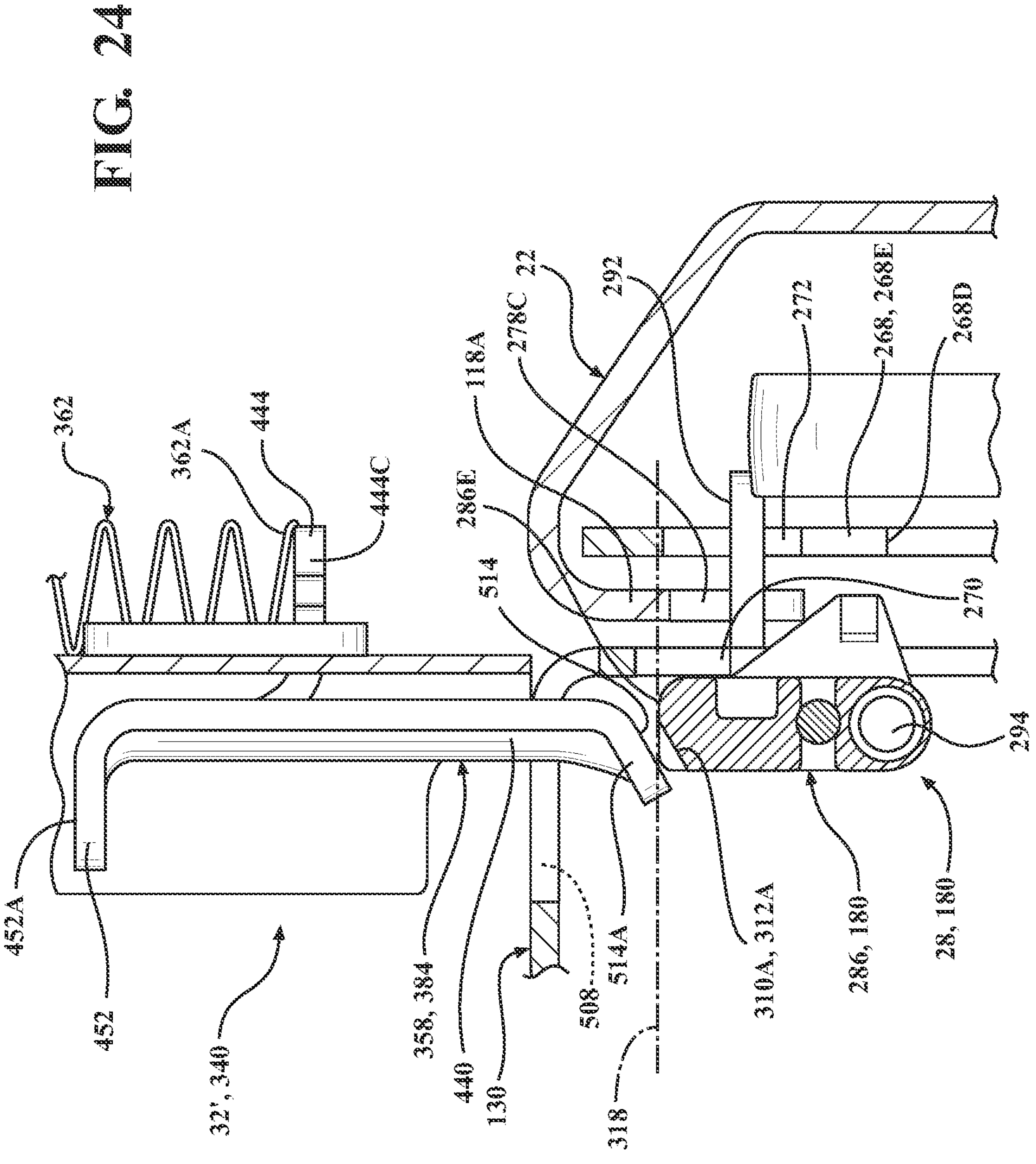
FIG. 24 shows a fragmentary cross-sectional end view of the long rail assembly of FIG. 23, showing the loop latch release system in the unactuated condition with the loop latch in the locked position.

The latch retainer 286 further includes a release trigger 310 for disengaging the loop latch 28 from the fixed long rail 22, as illustrated in FIGS. 7 through 9. In the embodiment shown in FIG. 8, the release trigger 310 includes a first release trigger 310A spaced apart from a second release trigger 310B. In alternate embodiments, the first and second release triggers 310A, 310B are portions of a single release trigger 310 projecting from the latch retainer 286. In still other embodiments, the first and second release triggers 310A, 310B are replaced by angled cutouts 310A' in the top surface 286E of the latch retainer 286, such as shown in FIG. 24.

Figure 15:
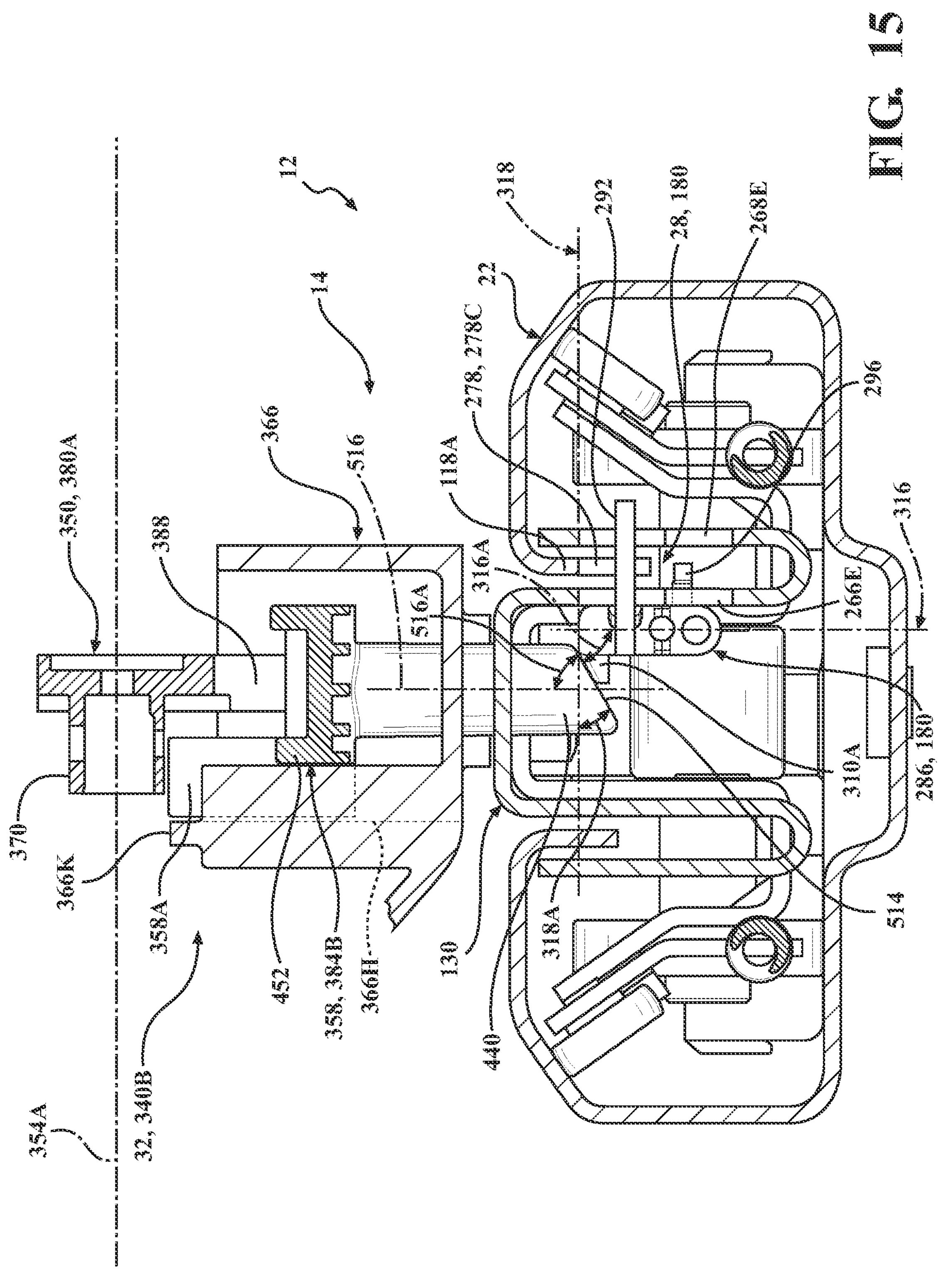
FIG. 15 is a cross-sectional end view of the long rail assembly of FIG. 14, showing the loop latch in the locked position with the dual plunger in the initial contact position.

As viewed in FIG. 9, each of the first and second release triggers 310A, 310B have a generally truncated triangular shape in profile with an upper surface 312A, 312B extending at a downward angle. The upper surface 312A, 312B of each release trigger 310A, 310B forms a trigger engagement pad 312A, 312B. The trigger engagement pad 312A, 312B extends between opposing end walls 314A, 314B (shown in FIG. 7) of the release trigger 310A, 310B. In addition, the trigger engagement pads 312A, 312B are inclined with respect to a vertical axis 316 of the latch retainer 286, as illustrated in FIG. 15. Further, the trigger engagement pads 312A, 312B have a vertical inclination angle 316A of about sixty degrees with respect to the vertical axis 316 of the latch retainer 286. As assembled as part of the rail drive assembly 14, a horizontal inclination angle 318A of the trigger engagement pads 312A, 312B with respect to a horizontal reference line 318 is approximately about thirty degrees. However, it will be understood that the vertical and horizontal inclination angles 316A, 318A of the trigger engagement pads 312A, 312B can be selected to be more or less than approximately sixty and thirty degrees, respectively, without altering the scope of the invention. Preferably, the trigger engagement pads 312A, 312B are non-parallel to the horizontal reference line 318 and non-parallel to the vertical axis 316 of the latch retainer 286.

Referring to FIG. 3, when the rail drive assembly 14 is assembled with the fixed long rail 22, the retaining lips 118A, 118B are positioned between the side walls 144A, 144B of the upper channel 130 and the outer channel wall(s) 260A. The retaining lips 118A, 118B include locking tabs 278C (shown in FIGS. 5 and 7) spaced along the longitudinal length of the retaining lips 118A, 118B. Since the loop latch 28 is spring-biased upwards towards the locked position 180 (shown in FIG. 5), the loops 292 are automatically moved between the unlocked position 182 (shown in FIG. 6) where the loops 292 are disengaged from the locking tabs 278C and the locked position 180 (shown in FIG. 5) where the loops 292 are frictionally and/or meshingly engaged with the locking tabs 278C in the retaining lips 118A, 118B of the fixed long rail 22. When the loops 292 are engaged with the locking tabs 278C in the retaining lips 118A, 118B, the rail drive assembly 14 is locked with the fixed long rail 22 such that the rail drive assembly 14 is retained in any one of the seat positions 60, 64 during system loading events. When the loops 292 are moved to the unlocked position 182 with respect to the locking tabs 278C in the retaining lips 118A, 118B, the rail drive assembly 14 is transposable along the fixed long rail 22.

Figure 14:
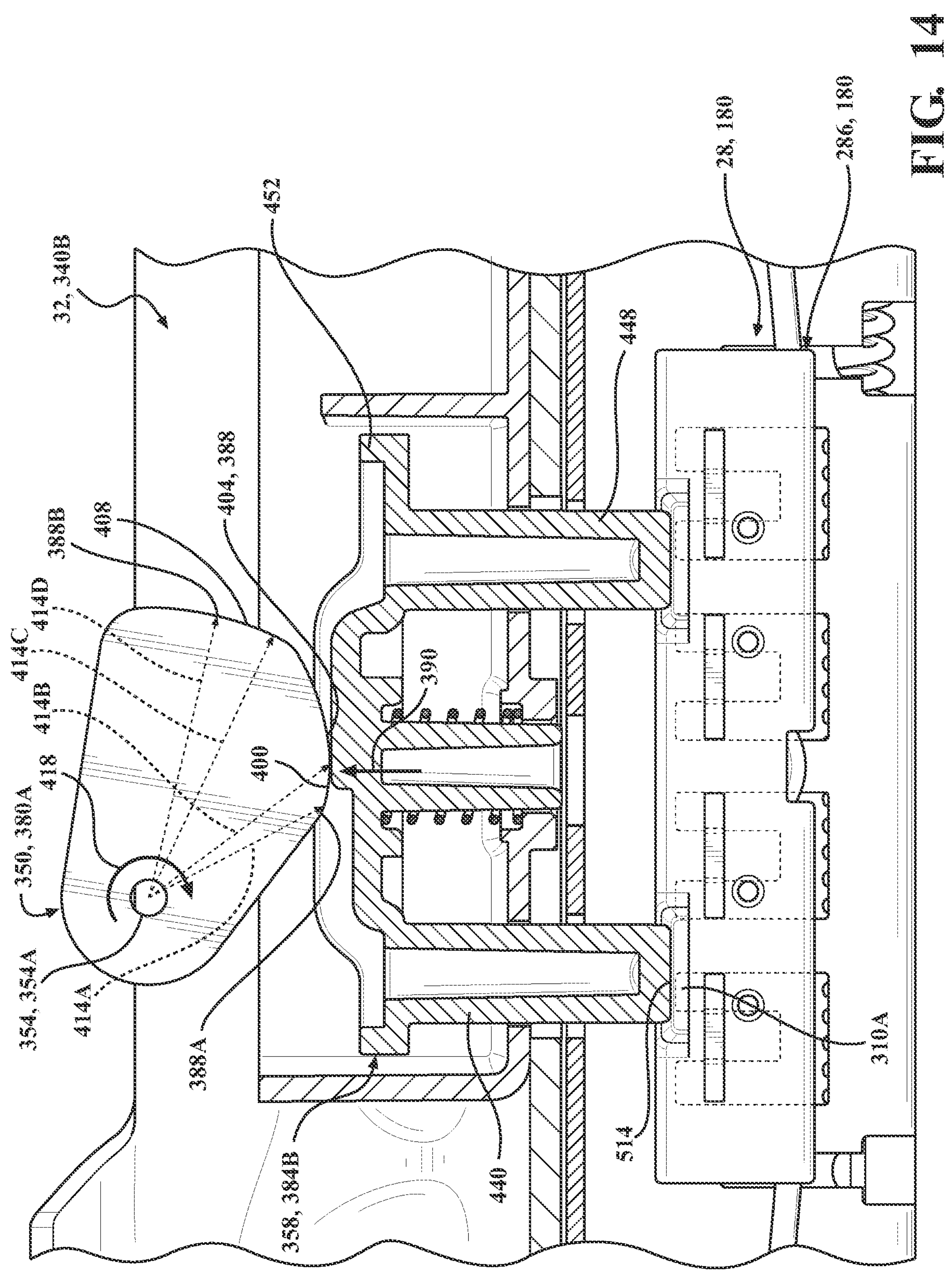
FIG. 14 is a fragmentary cross-sectional view of the long rail assembly of FIG. 11, showing the loop latch in the locked position and the dual plunger in an initial contact position.

The loop latch release system 32 is configured to automatically reposition the loop latch 28 from the locked position 180 (shown in FIG. 5) towards the unlocked position 182 (shown in FIG. 6). The loop latch release system 32 is shown in an unactuated condition 340 in FIGS. 8 and 9 with the loop latch 28 in the locked position 180. In comparison, the loop latch release system 32 is shown in an actuated condition 340A in FIGS. 16 and 17 with the loop latch 28 in the unlocked position 182. The loop latch release system 32 is in a transition condition 340B when the loop latch release system 32 is moving between the unactuated condition 340 and the actuated condition 340A, as illustrated in FIGS. 14 and 15.

Referring to the embodiment shown in FIG. 4, the loop latch release system 32 includes an actuator cam 350 fixedly coupled to a drive shaft 354, a dual plunger 358, a return spring 362, and a housing 366. Also shown in FIG. 4, the drive shaft 354 has an axis of rotation 354A defining an axis of rotation 354A of the actuator cam 350. In certain embodiments, the drive shaft 354 is operatively coupled to an electric motor for automatically rotating the drive shaft 354. It will be understood that the drive shaft 354 is rotated by any method generally known to one skilled in the art, including but not limited to an electric motor, a gear system, a lever, a cable, and the like, as non-limiting examples. The loop latch release system 32 shown in FIG. 4 is optionally integrated with a power long rail assembly 14 that is configured to be automatically repositioned along the fixed long rail 22.

The housing 366, shown in FIGS. 3 and 4, includes opposing side walls 366A, 366B extending between opposing end walls 366C, 366D (FIG. 4) and a bottom wall 366E (FIG. 3) extending between the opposing side walls 366A, 366B and the opposing end walls 366C, 366D defining a cavity 366F therebetween.

As shown in FIG. 4, the actuator cam 350 includes a collar 370 projecting at an angle from a cam body 374. Referring to FIG. 3, the collar 370 includes a bore 370A aligned with the axis of rotation 354A that is sized and shaped to matingly engage with an end portion 354B of the drive shaft 354. In addition, the collar 370 includes a passageway 370B extending through the collar 370 at an angle perpendicular to the axis of rotation 354A. The actuator cam 350 is formed out of one or more plastic materials. However, the actuator cam 350 can be formed out of alternate materials such as metal and combinations of metal and plastic.

Figure 10:
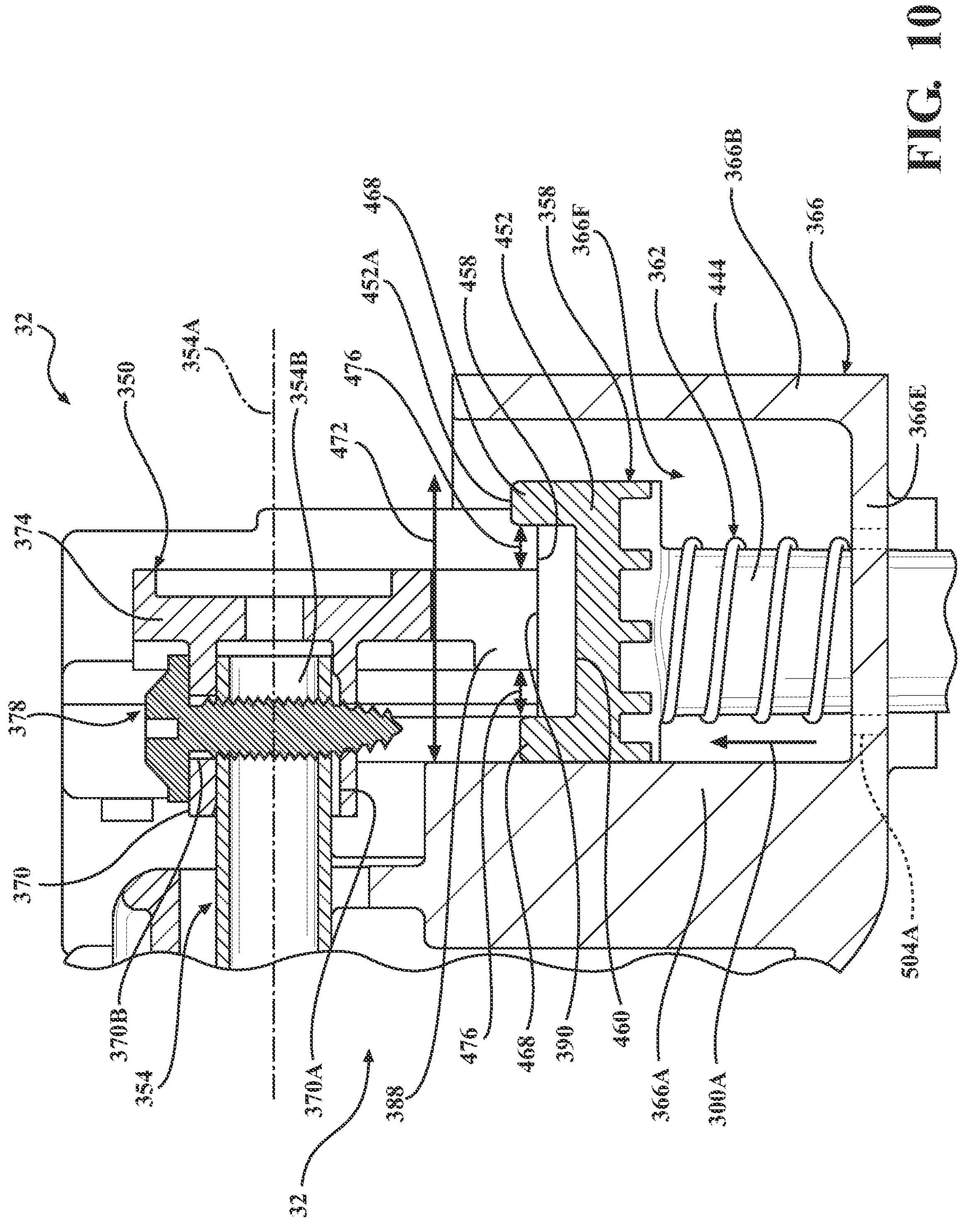
FIG. 10 is a fragmentary cross-sectional end view of a portion of the long rail assembly of FIG. 1 taken along section line A-A of FIG. 1, showing an actuator cam fixedly coupled to a drive shaft.

In the embodiment shown in FIG. 4, a mechanical fastener 378 fixedly couples the collar 370 to the drive shaft 354. Referring to FIG. 10, the mechanical fastener 378 is inserted through the passageway 370B in the collar 370 and through the drive shaft 354. However, it will be understood that alternate methods of attaching the collar 370 to the drive shaft 354, such as press-fit, snap feature, adhesive, retaining washer, retaining clip, pin, and the like, can be used without altering the scope of the invention. For example, in certain embodiments, the actuator cam 350 is operatively coupled to the drive shaft 354 via one or more gears. In still more embodiments, the actuator cam 350 is rotated by engagement with a lever, movement of a link, rotation of a gear, rotation of a drive shaft of an electric motor, actuating a Bowden cable, and the like, without altering the scope of the invention.

A cross-sectional view of the loop latch release system 32 is shown in FIG. 8, illustrating additional details of the actuator cam 350 and the dual plunger 358. Referring to FIG. 8, the actuator cam 350 is fixedly coupled to the drive shaft 354 with the drive shaft 354 defining an axis of rotation 354A for the actuator cam 350. The actuator cam 350 is shown in a home rotational position 380 with the dual plunger 358 in a retracted position 384 and the loop latch 28 in the locked position 180 in FIG. 8. In comparison, the actuator cam 350 is shown in a latch release rotational position 380B with the dual plunger 358 in an extended position 384A and the loop latch 28 in the unlocked position 182 in FIG. 16.

As shown in FIG. 8, the actuator cam 350 includes a cam surface 388 having a contact point 390 with the dual plunger 358. The cam surface 388 extends between a first end 388A and a second end 388B. Different portions 400, 404, 408 of the cam surface 388 are brought into contact with the dual plunger 358 as the actuator cam 350 is rotated by the drive shaft 354. Thus, the contact point 390 between the cam surface 388 and the dual plunger 358 is repositioned along different portions 400, 404, 408 of the cam surface 388 as the actuator cam 350 is rotated. For purposes of describing the relative motions of the actuator cam 350 with respect to resulting movements of the dual plunger 358 and the loop latch 28, the cam surface 388 is demarcated into a home position 414A, a first transition zone 400 extending between the home position 414A and an initial contact position 414B, a second transition zone 404 extending between the initial contact position 414B and a latch release position 414C, and a dwell zone 408 extending between the latch release position 414C and an end of dwell position 414D generally aligned with or near the second end 388B of the cam surface 388. The home position 414A may be aligned with, adjacent to, and/or offset from the first end 388A of the cam surface 388 without altering the scope of the invention.

When the actuator cam 350 is in the home rotational position 380, the actuator cam 350 is rotated in a clockwise direction 418, as viewed in FIG. 8, when moving the contact point 390 towards the latch release position 414C of the cam surface 388. In contrast, the actuator cam 350 is rotated in a counterclockwise direction 420, as viewed in FIG. 8, when the contact point 390 is aligned with the dwell zone 408 and the actuator cam 350 is returning to the home rotational position 380. It will be understood that the relative rotation of the actuator cam 350 clockwise and counterclockwise can be reversed in different embodiments. Further, it will be understood that the cam surface 388 of the actuator cam 350 can be adjusted to result in a desired amount of vertical motion of the dual plunger 358 in response to a predetermined.

In the embodiment shown in FIGS. 4 and 8, the dual plunger 358 has a generally M-shaped cross-section in profile comprising a first release plunger 440, an alignment boss 444, and a second release plunger 448 projecting at an angle from a cross piece 452. A passageway 454 (shown in FIG. 8) optionally extends longitudinally partially or fully through each of the first and second release plungers 440, 448 and the alignment boss 444. In various embodiments, the dual plunger 358 is formed of one or more of a plastic material, a fiber reinforced plastic material, a metal material, and combinations of metal and plastic, as non-limiting examples.

As shown in FIG. 8, the cross piece 452 has an upper surface 452A and a lower surface 452B. The upper surface 452A of the cross piece 452 includes a contact surface 458 sized and shaped to frictionally engage with the actuator cam 350. In the embodiment shown in FIG. 8, the cross piece 452 includes a cutout region 460 that provides clearance between the cross piece 452 and the actuator cam 350 as the actuator cam 350 is rotated through the dwell zone 408.

In one embodiment shown in FIG. 10, the contact surface 458 and the cutout region 460 are recessed below the upper surface 452A of the cross piece 452, forming a rim 468 extending around the outer periphery of the cross piece 452. The actuator cam 350 can be repositioned laterally, as illustrated by arrow 472, as a result of tolerance stack up, component variation, and the like. The actuator cam 350 is laterally retained in contact with the cross piece 452 by the rim 468. The actuator cam 350 and the dual plunger 358 can be repositioned laterally with respect to each other by an amount illustrated by arrows 476 and retain engagement between the actuator cam 350 and the dual plunger 358.

Referring to FIG. 8, the dual plunger 358 is positioned in the cavity 366F in the housing 366. Further, each of the first and second release plungers 440, 448 project through a respective hole 504 in the bottom wall 366E of the housing 366 and through a respective hole 508 in the upper channel 130. Likewise, the alignment boss 444 is configured to pass through an alignment hole 504A in the bottom wall 366E of the housing 366 and through a hole 508A in the upper channel 130.

As best shown in FIG. 4, each of the first and second release plungers 440, 448 have an outer side surface 512 extending between the cross piece 452 and an end surface 514 of the respective first and second release plunger 440, 448. Each of the first and second release plungers 440, 448 has a general truncated cylindrical shape with the outer side surface 512 forming the cylinder wall and the end surface 514 forming the truncated portion of the cylinder.

Referring to FIG. 9, the end surface 514 of each of the first and second release plungers 440, 448 forms a plunger engagement pad 514 configured to frictionally engage with and actuate a respective one of the release triggers 310A, 310B of the latch retainer 286. The plunger engagement pads 514 are inclined with respect to a longitudinal axis 516 of the first and second plungers 440, 448, as shown in FIG. 15. In the embodiment shown in FIG. 15, the plunger engagement pads 514 have a vertical inclination angle 516A of about sixty degrees with respect to the longitudinal axis 516 of the first and second plungers 440, 448. Preferably, the horizontal inclination angle 318A of the plunger engagement pads 514 is approximately equal to the horizontal inclination angle 318A of the trigger engagement pads 312A, 312B when assembled as part of the rail drive assembly 14, as illustrated in FIG. 15. Preferably, when the dual plunger 358 and the latch retainer 286 are assembled as part of the rail drive assembly 14, the plunger engagement pad 514 and the trigger engagement pad 312A, 312B are sized and shaped such that at least a portion of the plunger and trigger engagement pads 514, 312A, 312B are approximately parallel to each other.

In the embodiment shown in FIG. 9, both of the plunger and trigger engagement pads 514, 312A, 312B have a horizontal inclination angle 318B of about thirty degrees with respect to the horizontal reference line 318. It will be understood that in certain embodiments, one of the plunger and trigger engagement pads 514, 312A, 312B can have a horizontal inclination angle 318A that is greater than and/or less than the horizontal inclination angle 318A for the other one of the plunger and trigger engagement pads 514, 312A, 312B. Further, it is understood that the horizontal inclination angle 318A of the plunger and trigger engagement pads 514, 312A, 312B can be selected to be more or less than thirty degrees for specific applications. In addition, the plunger and trigger engagement pads 514, 312A, 312B are sized and shaped such the plunger engagement pad 514 will frictionally engage with a respective one of the trigger engagement pads 312A, 312B as the dual plunger 358 is moved vertically downward, as represented by arrow 300B. The plunger engagement pad 514 is shown frictionally engaged with the respective trigger engagement pad 312A, 312B in FIG. 5.

The relative size, shape, and orientation of the plunger and trigger engagement pads 514, 312A, 312B are selected such that downward vertical motion 300B of the dual plunger 358 applies a load 518 to the latch retainer 286 at an angle with respect to the horizontal reference line 318 of less than ninety degrees, as represented by arrow 518 shown in FIG. 9. In the embodiment shown in FIG. 9 with the plunger and trigger engagement pads 514, 312A, 312B generally orientated at approximately thirty degrees with respect to the horizontal reference line 318 as assembled with the upper channel 130, the load 518 is applied to the latch retainer 286 at an angle of approximately sixty degrees with respect to the horizontal reference line 318. It will be understood that in various embodiments, the relative angle of the plunger and trigger engagement pads 514, 312A, 312B and the resulting load 518 applied to the latch retainer 286 can vary from the values indicated. Since the load 518 applied by the dual plunger 358 is applied to the latch retainer 286 at an angle less than ninety degrees with respect to the horizontal reference line 318, the load 518 presses the latch retainer 286 towards the side wall 144B of the upper channel 130, as illustrated by arrow 520. The T-shaped protrusion 296 traveling along the guide slot 298 retains a lower portion 286F' of the latch retainer 286 adjacent the side wall 144B of the upper channel 130. Thus, the T-shaped protrusion 296 reduces the rotational movement 302 of the latch retainer 286 away from the side wall 144B of the upper channel 130. Further, the plunger engagement pad 514 has a larger surface area than the trigger engagement pad 312A, 312B. This compensates for an amount of misalignment between the dual plunger 358 and the latch retainer 286 while assuring that the plunger engagement pads 514 contact the respective trigger engagement pad 312A, 312B.

Figure 11:
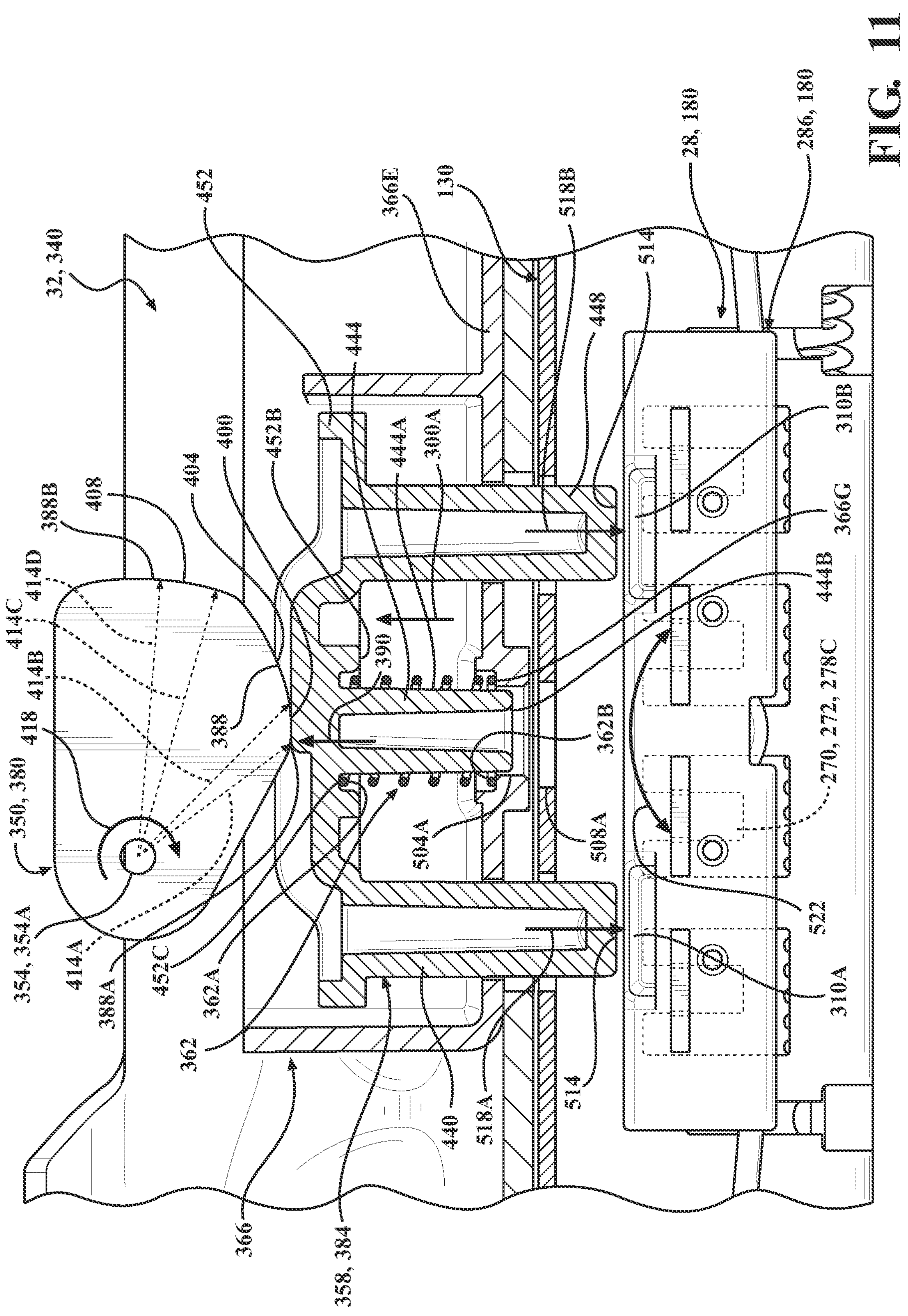
FIG. 11 is a fragmentary cross-sectional view of the long rail assembly of FIG. 9, showing the loops of the loop latch in the locked position with respect to locking tabs in the fixed long rail and in the upper channel.

Referring to FIG. 11, since the dual plunger 358 includes spaced apart first and second release plungers 440, 448, load 518A, 518B applied by the dual plunger 358 is distributed across two locations 310A, 310B of the latch retainer 286. More specifically, the loads 518A, 518B are applied to the spaced apart release triggers 310A, 310B. Distributing the load 518A, 518B across two spaced apart release triggers 310A, 310B reduces longitudinal rotation of the latch retainer 286, as illustrated by arrow 522.

The alignment boss 444 has an outer side surface 444A extending between the lower surface 452B of the cross piece 452 and an end surface 444B of the alignment boss 444, as shown in FIG. 11. The alignment boss 444 is sized and shaped to pass through the alignment hole 504A in the bottom wall 366E of the housing 366 and through the hole 508A in the upper channel 130.

In the embodiment shown in FIG. 11, the return spring 362 is an open-coil helical wound spring extending between opposing first and second spring ends 362A, 362B and defining a longitudinal passageway therethrough. It will be understood that alternate spring types can be used in place of the return spring 362, including but not limited to a flat spring, a compression spring, an extension spring, a flat spring, and the like. The alignment boss 444 is inserted through the longitudinal passageway in the return spring 362. The first spring end 362A is retained in a circular recess 452C in the lower surface 452B of the cross piece 452. The second spring end 362B is retained within a circular recess 366G in the bottom wall 366E of the housing 366. The return spring 362 biases the dual plunger 358 upward, as illustrated by arrow 300A.

As shown in FIG. 10, the return spring 362 biasing the dual plunger 358 upward (arrow 300A) also biases the dual plunger 358 towards an engaged position with the cam surface 388 of the actuator cam 350. Thus, the return spring 362 compensates for variation in certain dimensions of the dual plunger 358 and the actuator cam 350, as well as variation in position of the dual plunger 358 and the actuator cam 350 as assembled as part of the loop latch release system 32.

Figure 12:
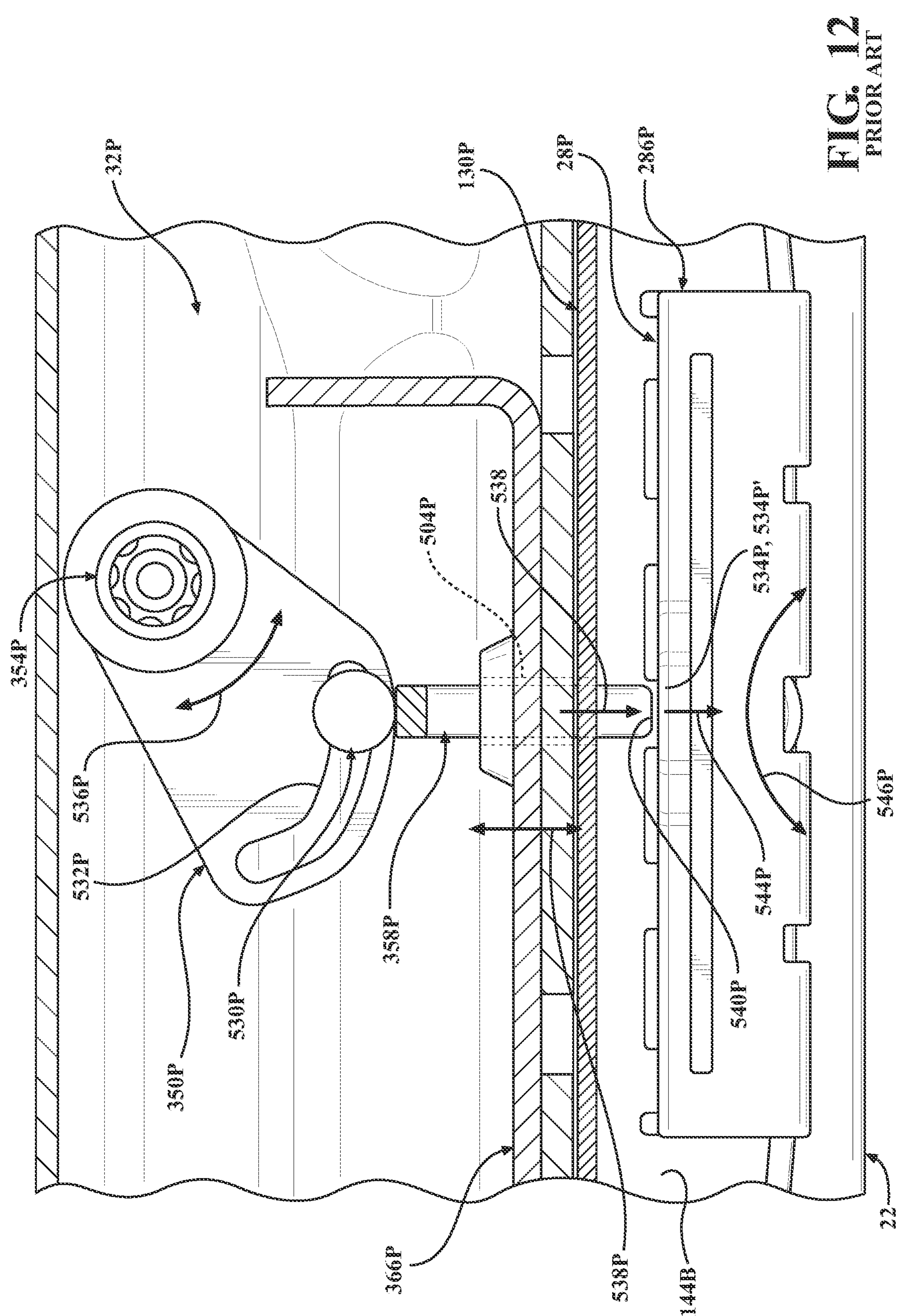
FIG. 12 is a fragmentary cross-sectional view of a known long rail assembly, showing a loop latch release mechanism with a plunger having a single contact point with a loop latch.
Figure 13:
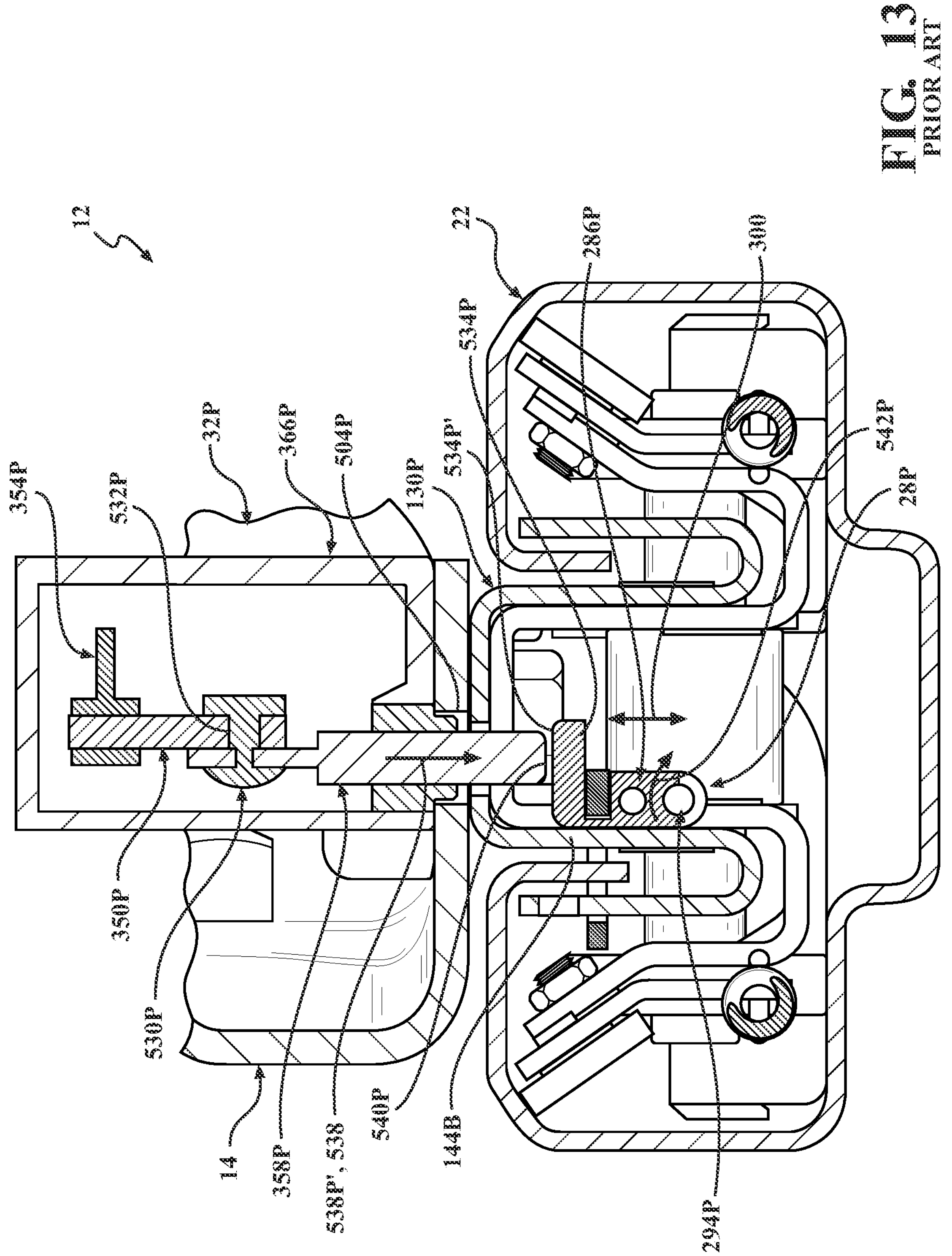
FIG. 13 is a cross-sectional end view of the known long rail assembly of FIG. 12, showing the plunger of the loop latch release mechanism being directly coupled to an actuator cam.

FIGS. 12 and 13 illustrate a known loop latch release mechanism 32P comprising an actuator cam 350P rotated by a drive shaft 354P, a plunger 358P connected by a rivet 530P to a cam slot 532P within the actuator cam 350P, and a housing 366P having an alignment passageway 504P. The alignment passageway 504P extends through an upper channel 130P. Within the upper channel 130P is a loop latch 28P having a latch retainer 286P. Referring to FIG. 13, the latch retainer 286P is configured to travel vertically up and down a side wall 144B of the upper channel 130P, as illustrated by arrow 300. Further, the latch retainer 286P is biased upward by a spring 294P. A release tab 534P projects from the latch retainer 286P in a horizontal direction as assembled. The plunger 358P is positioned vertically above the release tab 534P. As shown in FIG. 12, rotation of the actuator cam 350P by the drive shaft 354P, illustrated by arrow 536P, causes the rivet 530P to travel along the cam slot 532P. The cam slot 532P is sized and shaped such that the rivet 530P is moved vertically up and down, as illustrated by arrow 538P, causing the plunger 358P to be moved up and down as the actuator cam 350P is rotated.

When the known plunger 358P is moved downward, as illustrated by arrow 538P' in FIG. 13, a lower end surface 540P of the plunger 358P frictionally engages with the release tab 534P of the latch retainer 286P. Since the lower end surface 540P of the plunger 358P and an upper surface 534P' of the release tab 534P are generally horizontal, downward load 538 applied by the plunger 358P to the release tab 534P can rotate the release tab 534P away from the side wall 144B of the upper channel 130P, as illustrated by arrow 542P. Misalignment of the plunger 358P and the release tab 534P can further accentuate the rotation of the latch retainer 286P. The load 538 applied to the latch retainer 286P, as shown in FIG. 12, moves the latch retainer 286P downward, as illustrated by arrow 544P. A single point of engagement between the plunger 358P and the latch retainer 286P on the release tab 534P can result in longitudinal rotation of the latch retainer 286P, as illustrated by arrow 546P. In addition, since the plunger 358P is directly coupled to the actuator cam 350P, variation in component dimensions as well as variation in relative positions of the plunger 358P, the housing 366P, the drive shaft 354P, the upper channel 130P, and the latch retainer 286P can affect operation of the known loop latch release mechanism 32P. Further, misalignment of individual components, such as the actuator cam 350P and the plunger 358P as an example, can result in component wear, binding, and noise during operation of the known loop latch release mechanism 32P.

In contrast, the actuator cam 350 is decoupled from the dual plunger 358 in the loop latch release system 32 shown in FIGS. 3 through 11. The configuration of the actuator cam 350 and the dual plunger 358 in combination with the return spring 362 biasing the dual plunger 358 towards the engaged position with the actuator cam 350 results in the loop latch release system 32 being tolerant of dimensional variation within components as well as relative positions of components as assembled. In addition, tendency of the latch retainer 286 to rotate longitudinally (arrow 522 shown in FIG. 11) is reduced since the dual plunger 358 includes two points of contact with the latch retainer 286. Further, the latch retainer 286 is less likely to rotate away from the side wall 144B of the upper channel 130, as illustrated by arrow 302 shown in FIG. 9, since the plunger and trigger engagement pads 514, 312A, 312B are orientated at an angle of about thirty degrees with respect to the horizontal reference line 318 when assembled.

Figure 17:
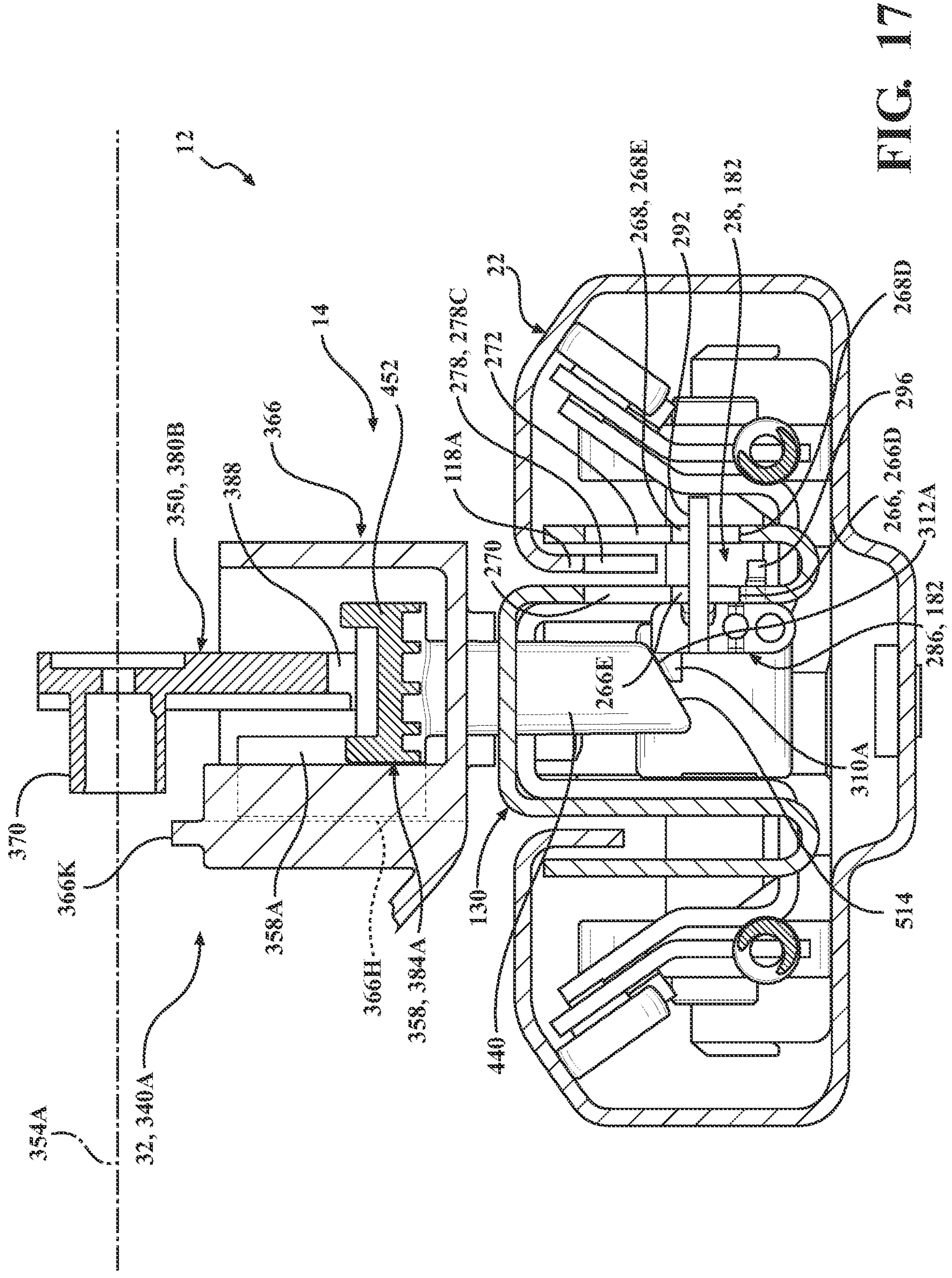
FIG. 17 is a cross-sectional end view of the long rail assembly of FIG. 16, showing the loop latch in the unlocked position and the dual plunger in the extended position.

In the embodiment shown in FIGS. 15 and 17, the dual plunger 358 includes an second alignment boss 358A extending from the cross piece 452 that is configured to slide along an alignment channel 366H in the housing 366. The alignment channel 366H in combination with the second alignment boss 358A guide the vertical movement of the dual plunger 358 as the dual plunger 358 moves between the retracted position 384, the initial contact position 384B, and the extended position 384A.

Motion of the loop latch release system 32 and the loop latch 28 are discussed below in regards to FIGS. 11 through 19E. The actuator cam 350 is shown in the home rotational position 380 in FIG. 11. In addition, the dual plunger 358 is shown in the retracted position 384 and the latch retainer 286 in the locked position 180. The contact point 390 between the dual plunger 358 and the actuator cam 350 is near the first end 388A of the cam surface 388 and aligned with the home position 414A. Shown in FIG. 9, the plunger engagement pads 514 are spaced apart from the respective first and second release triggers 310A, 310B when the dual plunger 358 is in the retracted position 384. As illustrated in FIG. 9, the loop latch 28 is in the locked position 180 when the dual plunger 358 is spaced apart from the latch retainer 286.

When the actuator cam 350 is in the home rotational position 380 shown in FIG. 11 and a latch release operation is initiated, the actuator cam 350 is rotated in the direction of arrow 418. The dual plunger 358 is moved downward towards the latch retainer 286 as the contact point 390 is moved along the cam surface 388 towards the initial contact position 414B. The actuator cam 350 is shown in an initial contact rotational position 380A with the actuator cam 350 rotated such that the contact point 390 is aligned with the initial contact position 414B of the cam surface 388 in FIG. 14. The first and second release plungers 440, 448 are in contact with the release triggers 310A, 310B with the latch retainer 286 still in the locked position 180, as shown in FIGS. 14 and 15.

Figure 16:
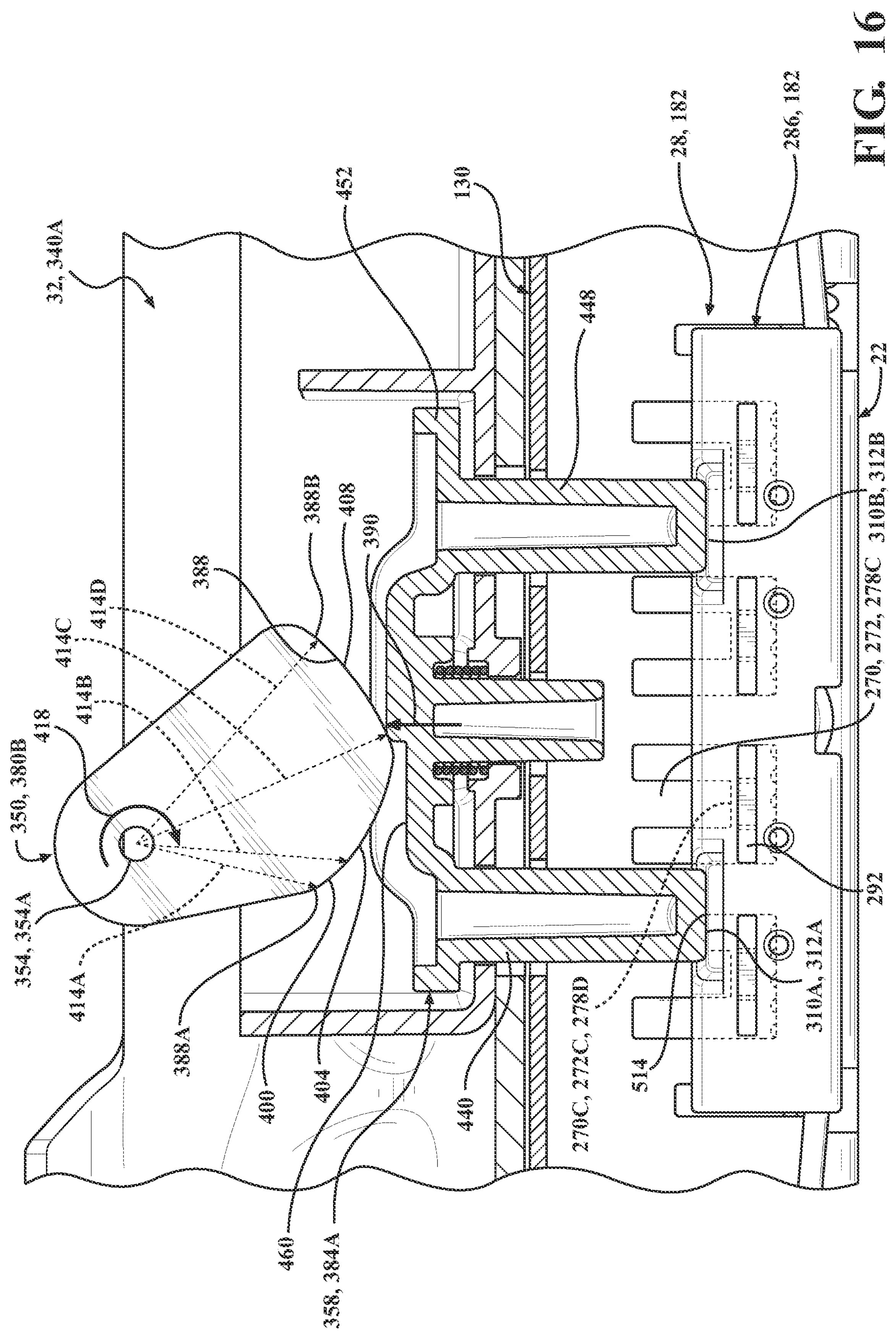
FIG. 16 is a fragmentary cross-sectional view of the long rail assembly of FIG. 15, showing the loop latch in an unlocked position and the dual plunger in an extended position.

Referring to FIG. 16, additional rotation of the actuator cam 350 in the clockwise direction 418 results in the contact point 390 moving towards the latch release position 414C on the cam surface 388. As shown in FIGS. 16 and 17, the dual plunger 358 is pressed downward as the actuator cam 350 rotates. Movement of the dual plunger 358 repositions the latch retainer 286 downward since the first and second release plungers 440, 448 are frictionally engaged with the release triggers 310A, 310B. The loop latch release system 32 is shown in the actuated condition 340A with the actuator cam 350 in a latch release rotational position 380B in FIGS. 16 and 17. Further, the dual plunger 358 is shown in an extended position 384A and the latch retainer 286 is shown in the unlocked position 182 in FIGS. 16 and 17. Also shown, the loops 292 are disengaged from the locking tabs 270, 272, 278C in the upper channel 130 and in the fixed long rail 22. More specifically, the loops 292 are positioned in the gap 266E, 268E between the locking tabs 270, 272, 278C and the lower end surface 266D, 268D of the U-shaped slots 266, 268, as shown in FIG. 17. The upper channel 130 can be repositioned along the fixed long rail 22 while the loops 292 are disengaged from the locking tabs 270, 272, 278C in the upper channel 130 and the fixed long rail 22.

Also shown in FIG. 16, additional rotation of the actuator cam 350 in the clockwise direction 418 past the latch release position 414C does not result in additional downward movement of the dual plunger 358 since the cam surface 388 includes the dwell zone 408 and the cross piece 452 includes the cutout region 460. The cutout region 460 in the cross piece 452 provides clearance space for additional rotation of the actuator cam 350 past the latch release position 414C without resulting in additional vertical motion of the dual plunger 358. This compensates for additional variation in dimensions and positions of components as well as variation in rotational movement without affecting the operation of the loop latch release system 32 and the loop latch 28.

FIGS. 15 and 17 illustrate another embodiment of the dual plunger 358 having an optional alignment boss 358A. Referring to FIG. 15, the alignment boss 358A projects from the cross piece 452 oriented generally parallel with the first and second plungers 440, 448. The housing 366 includes a channel 366H configured to matingly engage with the alignment boss 358A of the dual plunger 358. The alignment boss 358A travels along the channel 366H in the housing 366 as the dual plunger 358 moves vertically in the housing 366. FIG. 15 shows the alignment boss 358A positioned near a top portion 366K of the housing 366. In contrast, FIG. 17 shows the alignment boss 358A spaced apart from the top portion 366K of the housing 366. The alignment boss 358A reduces lateral movement of the dual plunger 358 as the dual plunger 358 moves vertically since the alignment boss 358A is retained in the channel 366H of the housing 366.

FIGS. 18A-18E and 19A-19E illustrate the motion of the actuator cam 350, the dual plunger 358, and the loop latch 28 as the loop latch release system 32 is actuated from the unactuated condition 340 towards the actuated condition 340A and returned to the unactuated condition 340. More specifically, FIGS. 18A and 19A show the loop latch release system 32 in the unactuated condition 340 with the actuator cam 350 in the home rotational position 380, the dual plunger 358 in the retracted position 384, and the loop latch 28 in the locked position 180.

When the loop latch release system 32 is in the unactuated condition 340 shown in FIGS. 18A and 19A and the latch release operation is initiated, the actuator cam 350 is rotated in the clockwise direction 418 as shown in FIG. 18B. FIGS. 18B and 19B show the loop latch release system 32 in the transition condition 340B with the actuator cam 350 rotated to the initial contact rotational position 380A, the dual plunger 358 in contact 384B with the latch retainer 286, and the loop latch 28 in the locked position 180.

Additional rotation of the actuator cam 350 in the clockwise direction 418 results in the loop latch 28 being repositioned to the unlocked position 182, as shown in FIGS. 18C and 19C. FIGS. 18C and 19C show the loop latch release system 32 in the actuated condition 340A with the actuator cam 350 rotated to the latch release rotational position 380B, the dual plunger 358 in the extended position 384A, and the loop latch 28 in the unlocked position 182. The upper channel 130 can be repositioned along the fixed lower rail 22 while the loop latch 28 is in the unlocked position 182.

A latch relock operation is initiated when the loop latch release system 32 is in the actuated condition 340A shown in FIGS. 18C and 19C and the upper channel 130 is in the desired position 14' along the fixed lower rail 22. The latch relock operation rotates the actuator cam 350 in the counterclockwise direction 420, as shown in FIG. 18D, towards the initial contact rotational position 380A shown in FIGS. 18D and 19D. The return spring 362 biases the dual plunger 358 towards the actuator cam 350 such that the dual plunger 358 is retracted towards the initial contact position 384B as the actuator cam 350 is rotated. The loop latch 28 is automatically repositioned towards the locked position 180 by the spring 294 as the dual plunger 358 is retracted. FIGS. 18D and 19D show the loop latch release system 32 in the transition condition 340B with the actuator cam 350 rotated to the initial contact rotational position 380A, the dual plunger 358 in contact 384B with the latch retainer 286, and the loop latch 28 in the locked position 180.

Additional counterclockwise rotation 420 of the actuator cam 350 returns the loop latch release system 32 to the unactuated condition 340 shown in FIGS. 18E and 19E with the actuator cam 350 rotated to the home rotational position 380, the dual plunger 358 in the retracted position 384 spaced apart from the loop latch 28, and the latch in the locked position 180. The loop latch release system 32 is retained in the unactuated condition 340 until another latch release operation is initiated.

Figure 20:
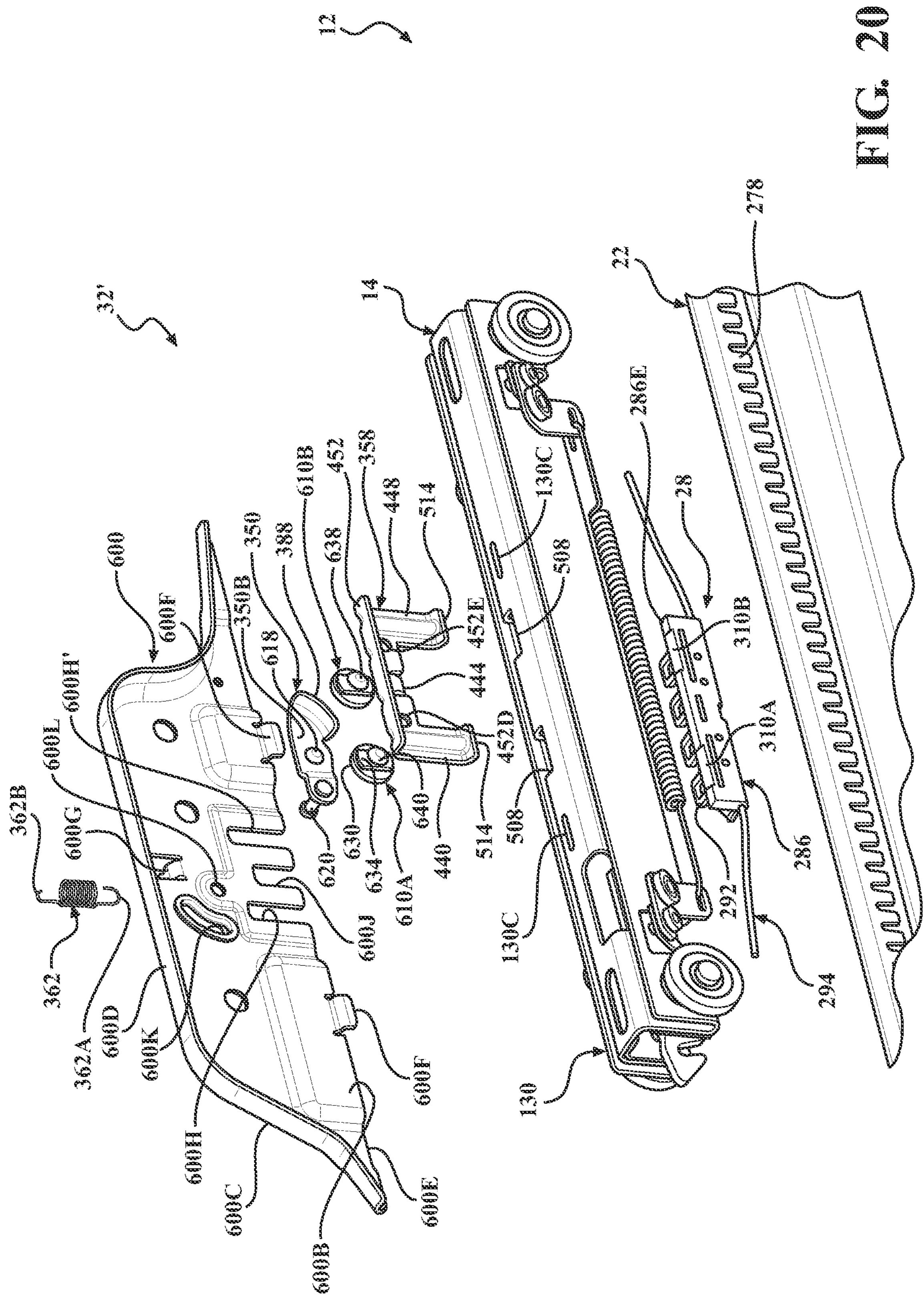
FIG. 20 is an exploded perspective view of a long rail assembly having a loop latch release system, according to a second embodiment of the present invention.

Another embodiment 32' of the loop latch release system 32 of FIG. 1 is shown in FIGS. 20 through 26. Elements in FIGS. 20-26 that are the same or similar to those used above in the embodiments shown in FIGS. 1-11 and 14-19 have the same reference numbers for simplicity. Only the significant differences in relation to the embodiments shown in FIGS. 1-11 and 14-19 are highlighted below. Referring to FIG. 20, the loop latch release system 32' includes at least a housing bracket 600, an actuator cam 350, a dual plunger 358, a return spring 362, and first and second plunger guides 610A, 610B. The loop latch release system 32' is operatively coupled to an upper channel 130 as part of a rail drive assembly 14. Integrated within the rail drive assembly 14 is a loop latch 28 and a spring 294. The loop latch 28 includes a plurality of loops 292 extending from a latch retainer 286. In addition, spaced apart first and second release triggers 310A, 310B are formed in an top surface 286E of the latch retainer 286. The rail drive assembly 14 is further assembled with a fixed long rail 22 to form a long rail assembly 12.

Figure 21:
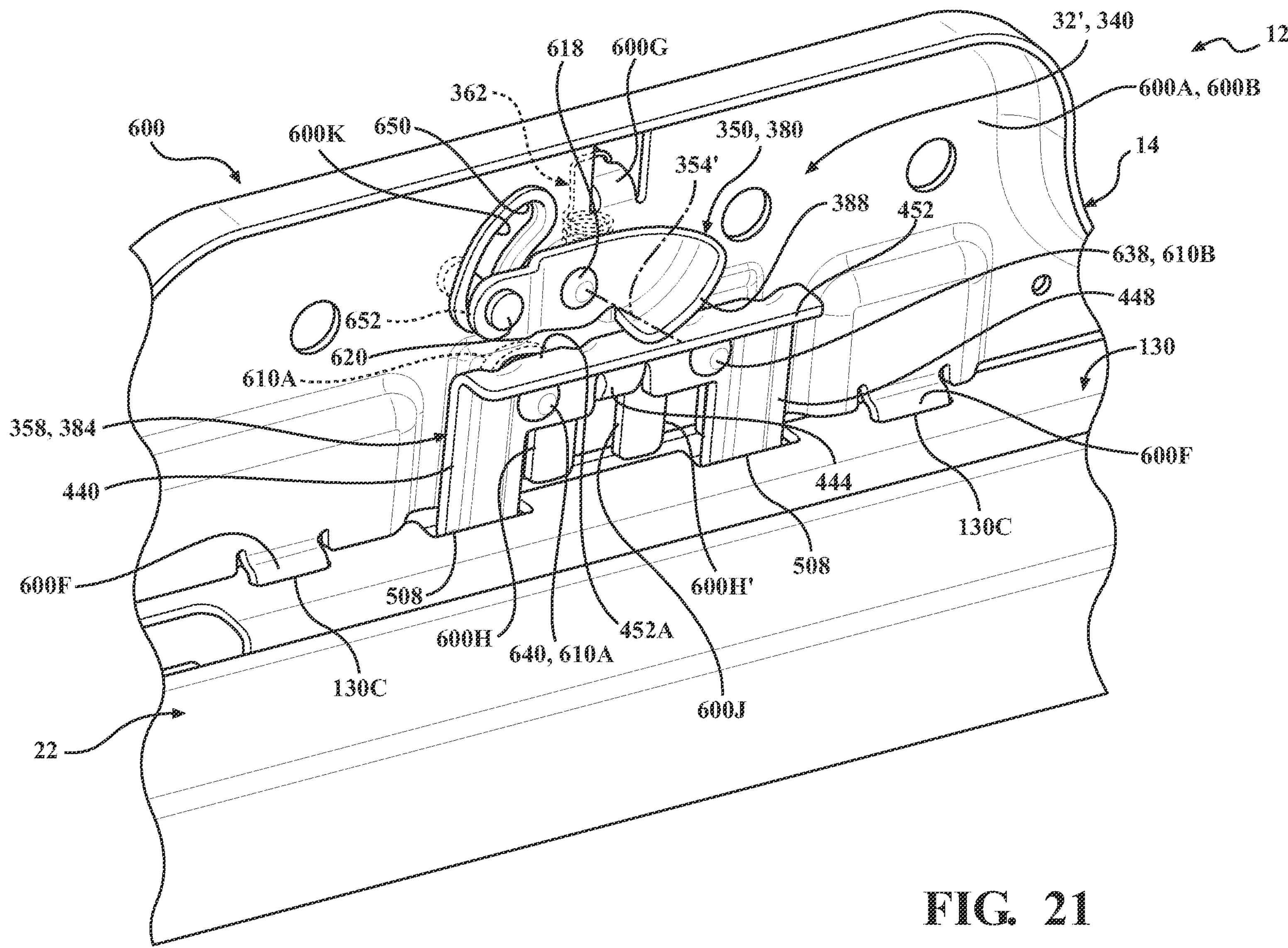
FIG. 21 is a fragmentary perspective view of the long rail assembly of FIG. 20, showing the assembled loop latch release system.
Figure 22:
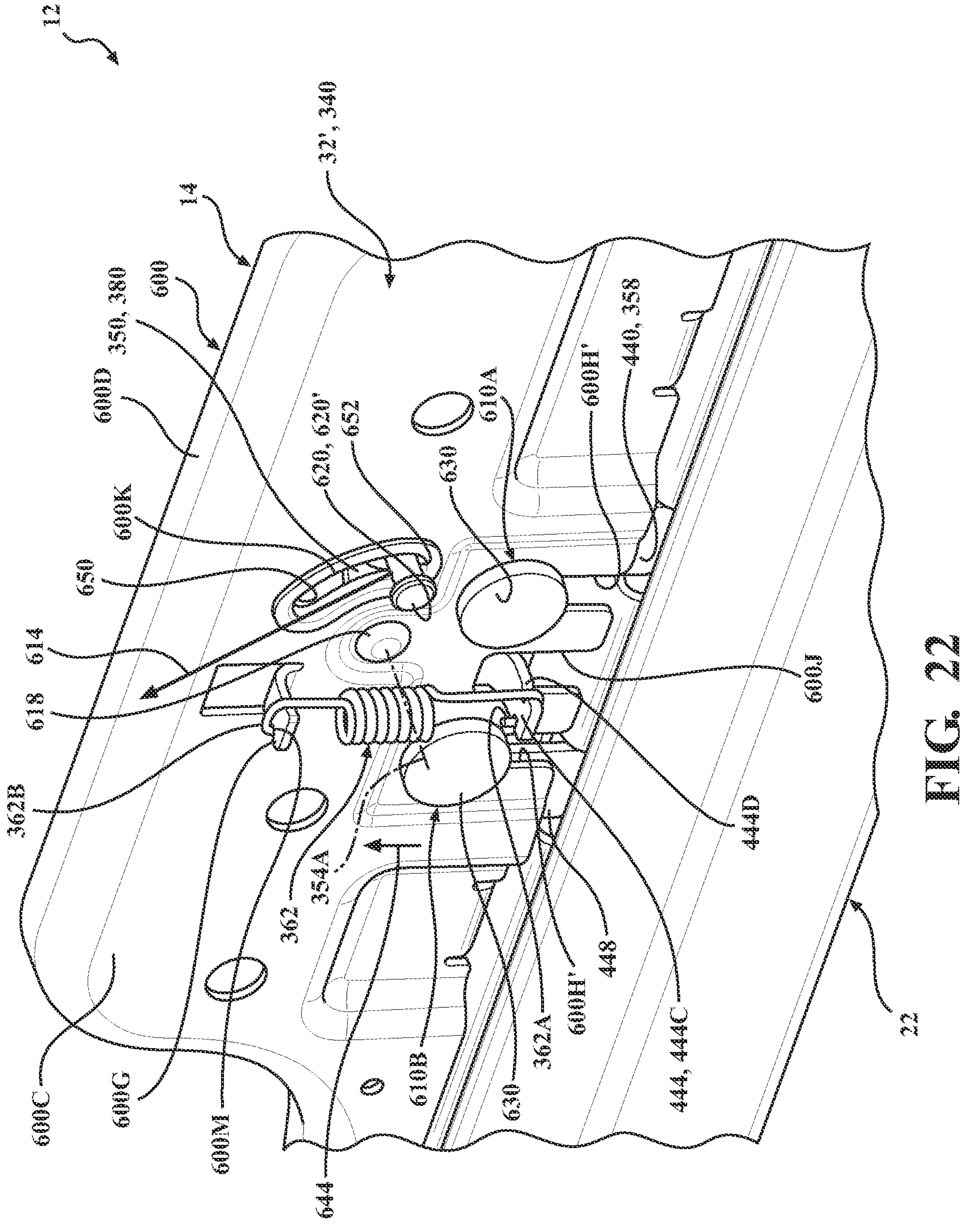
FIG. 22 is a fragmentary perspective view of the long rail assembly of FIG. 21, showing a return spring operatively coupled between the dual plunger and a housing bracket.

The loop latch release system 32' is shown assembled in FIG. 21. Referring to FIG. 21, one difference substantially involves the housing 366 of FIG. 3 being replaced by the housing bracket 600. Referring to FIG. 22, a second difference substantially involves the actuator cam 350 being rotated by a Bowden cable 614 in place of the drive shaft 354 shown in FIG. 4. Rotating the actuator cam 350 by Bowden cable 614 in place of the drive shaft 354 is preferable when the rail drive assembly 14 is a manual rail drive assembly 14 that lacks automatic movement capabilities. Also shown in FIG. 22, a third difference substantially involves the compression return spring 362 shown in FIG. 4 being replaced with an extension return spring 362.

The actuator cam 350, shown in FIG. 20, includes a cam surface 388 projected at an angle from a base portion 350B of the actuator cam 350. A pivot shaft 618 extends through the base portion 350B and defines an axis of rotation of the actuator cam 350. In addition, a link pin 620 is fixedly coupled to the base portion 350B and projects away from the actuator cam 350.

The dual plunger 358, also shown in FIG. 20, includes spaced apart first and second release plungers 440, 448 projecting away from a cross piece 452. The cross piece 452 includes first and second through holes 452D, 452E for attaching a respective one of the first and second plunger guides 610A, 610B. As best shown in FIG. 24, the first and second release plungers 440, 448 extend generally vertically away from the cross piece 452 as assembled as part of the loop latch release system 32'. In certain embodiments, the dual plunger 358 is a stamped and formed metal bracket. However, other embodiments of the dual plunger 358 are formed of plastic, fiber reinforced plastic, and/or combinations of metal and plastic.

Figure 23:
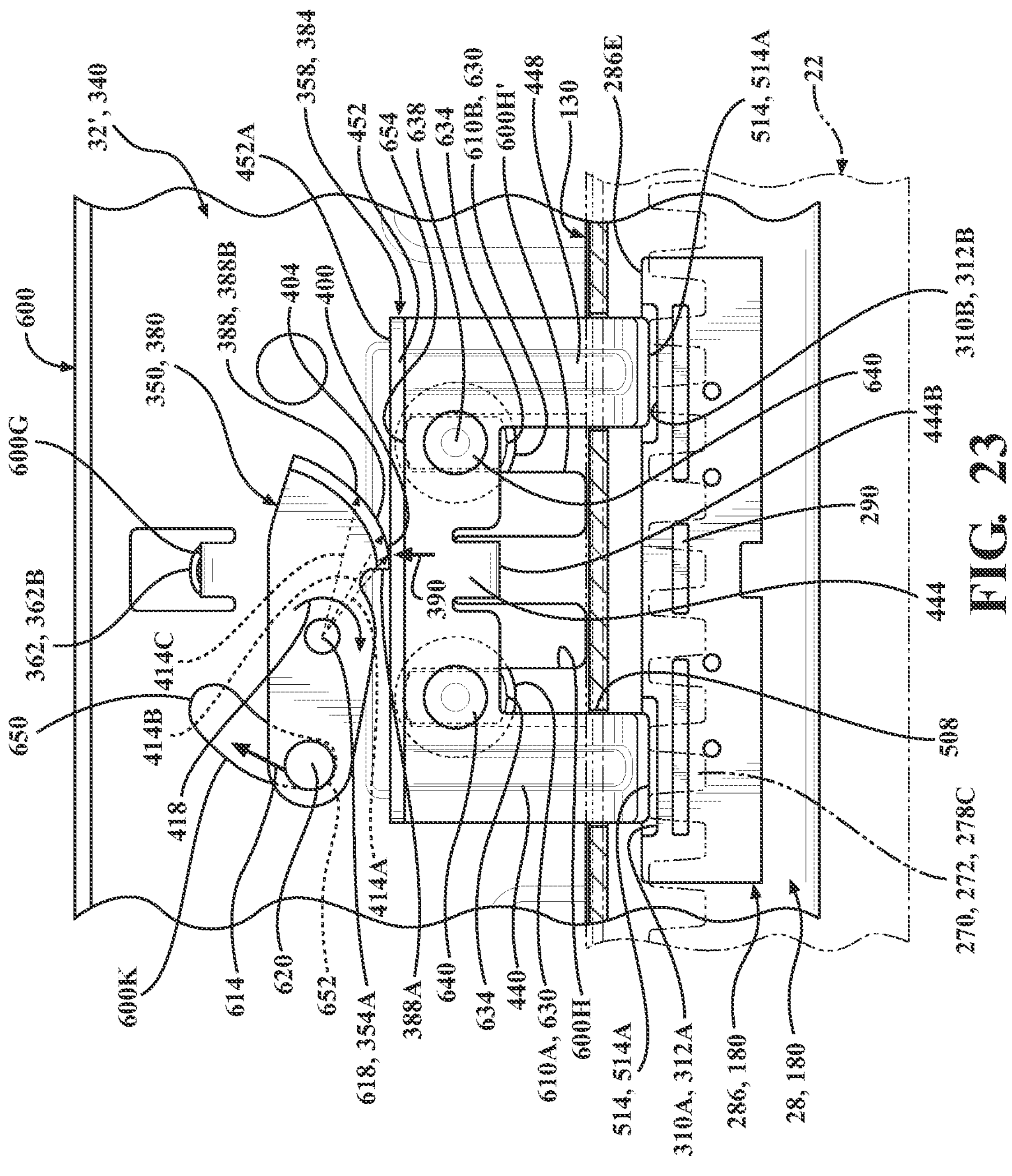
FIG. 23 shows a fragmentary cross-sectional view of the long rail assembly of FIG. 22, showing the loop latch release system in an unactuated condition with the loop latch in the locked position.

As shown in FIG. 23, the dual plunger 358 is generally U-shaped with the first and second release plungers 440, 448 forming opposing sides of the U-shape. Referring to FIG. 24, each of the first and second release plungers 440, 448 have a bent end portion 514A forming a plunger engagement pad 514. In the embodiment shown in FIG. 24, the plunger engagement pad 514 is oriented at about a thirty degree angle with respect to a horizontal reference line 318 as assembled. More specifically, each plunger engagement pad 514 is sized and shaped such that each plunger engagement pad 514 is generally parallel to an associated first or second release triggers 310A, 310B formed in the latch retainer 286.

Referring to FIGS. 23 and 24, each for the first and second release triggers 310A, 310B comprise notches 312A, 312B formed in a top surface 286E of the latch retainer 286. The notches 312A, 312B are configured as trigger engagement pads 312A, 312B for the associated first and second release plungers 440, 448. Referring to FIG. 23, each trigger engagement pad 312A, 312B in the latch retainer 286 has a longitudinal width greater than a longitudinal width of the associated first and second release plungers 440, 448. As shown in FIG. 24, the trigger engagement pads 312A, 312B are sized and shaped to be generally parallel to the associated plunger engagement pads 514 of the first and second release plungers 440, 448 as assembled. In the embodiment shown in FIG. 24, the trigger engagement pads 312A, 312B are oriented at about thirty degrees from a horizontal reference line 318 as assembled.

Shown in FIG. 21, the cross piece 452 of the dual plunger 358 includes an upper surface 452A configured to frictionally engage with the actuator cam 350 as assembled. Referring to FIG. 24, a tab 444 projects away from the cross piece 452 and includes a generally horizontal end portion 444C. As shown in FIG. 22, the end portion 444C of the tab 444 includes opposing slots 444D configured to retain the first spring end 362A of the return spring 362.

Referring to FIGS. 20 and 23, each of the first and second plunger guides 610A, 610B include a disc-shaped base 630, a guide 634 projecting from the disc-shaped base 630, and a shank 638 projecting from the guide 634 terminating in a rivet head 640.

The housing bracket 600, shown in FIG. 20, is a stamped bracket with a main portion 600A having opposing first and second sides 600B, 600C and spaced apart upper and lower surfaces 600D, 600E, spaced apart first and second base tabs 600F projecting from the lower surface 600E of the main portion 600A, and a bent tab 600G projecting at an angle from the main portion 600A. In addition, the main portion 600A includes spaced apart first and second guide slots 600H, 600H', a center slot 600J, an arcuate-shaped slot 600K, and a pivot hole 600L extending between the opposing first and second sides 600B, 600C.

The return spring 362 is an extension spring having first and second curved spring ends 362A, 362B, as illustrated in FIG. 20. Referring to FIG. 22, the first and second curved spring ends 362A, 362B are sized and shaped to be retained in associated slots 444D, 600M in the tab 444 and the bent tab 600G.

Referring to FIG. 20, the upper channel 130 includes spaced apart slots 130C configured to be assembled with the spaced apart first and second base tabs 600F of the housing bracket 600. In addition, the upper channel 130 includes spaced apart holes 508 sized and shaped to be assembled with the respective first and second release plungers 440, 448.

The assembled loop latch release system 32' is shown in FIGS. 21 and 22. Referring to FIGS. 21 and 22, the actuator cam 350 is assembled with the housing bracket 600 by passing the pivot shaft 618 and the link pin 620 through the pivot hole 600L (shown in FIG. 20) and the arcuate-shaped slot 600K, respectively, in the housing bracket 600. The first and second plunger guides 610A, 610B are assembled with the dual plunger 358 by passing the shank 638 of each of the first and second plunger guides 610A, 610B through an associated through hole 452D, 452E (shown in FIG. 20) in the dual plunger 358. In certain embodiments, the rivet heads 640 of the first and second plunger guides 610A, 610B are formed after the first and second plunger guides 610A, 610B are assembled with the dual plunger 358. It will be understood that the first and second plunger guides 610A, 610B can be assembled with the dual plunger 358 with alternate methods, including but not limited to mechanical fasteners.

The dual plunger 358 is assembled with the housing bracket 600 by sliding the first and second plunger guides 610A, 610B into an associated guide slot 600H, 600H' of the housing bracket 600, as shown in FIG. 22. More specifically, the dual plunger 358 is assembled with the disc-shaped base 630 of each of the first and second plunger guides 610A, 610B abutting the second side 600C of the housing bracket 600 (shown in FIG. 22) with the dual plunger 358 abutting the first side 600B of the housing bracket 600 (shown in FIG. 21). In addition, the guide 634 of each of the first and second plunger guides 610A, 610B is aligned within the associated guide slot 600H, 600H', as shown in FIG. 23. The guides 634 are sized and shaped to fit within the associated guide slot 600H, 600H' and maintain alignment of the dual plunger 358 with the guide slots 600H, 600H' in the housing bracket 600. Further, the guides 634 are configured to be slide vertically along the associated guide slot 600H, 600H'.

Also shown in FIGS. 21 and 22, the tab 444 of the dual plunger 358 is inserted through the center slot 600J in the housing bracket 600. Referring to FIG. 22, the return spring 362 is operatively coupled between the housing bracket 600 and the dual plunger 358. More specifically, the first spring end 362A is assembled with the tab 444 of the dual plunger 358 by passing the first spring end 362A through the slots 444D in the end portion 444C of the tab 444. The second spring end 362B is assembled with the bent tab 600G in the housing bracket 600 by sliding the second spring end 362B through the slots 600M in the bent tab 600G. It will be understood that other types, sizes, and shapes of springs can be used in place of the return spring 362 and that alternate methods of operatively coupling the return spring 362 between the housing bracket 600 and the dual plunger 358 can be used in various embodiments. The return spring 362 spring-biases the dual plunger 358 towards the actuator cam 350, as illustrated by arrow 644. Thus, while an extension spring 362 is shown in FIG. 22, alternate spring types and attachment methods, such as the compression spring 362 of the embodiment shown in FIG. 4, can be used without altering the scope of the invention.

Referring to FIG. 21, the housing bracket 600 is assembled with the upper channel 130 by sliding the first and second base tabs 600F of the housing bracket 600 through the associated slots 130C in the upper channel 130. In addition, the first and second release plungers 440, 448 of the dual plunger 358 are inserted into the associated through holes 508 in the upper channel 130.

A Bowden cable, represented by arrow 614 shown in FIG. 22, is fixedly coupled to a distal end 620' of the link pin 620. During operation, the Bowden cable 614 rotates the link pin 620 upward towards an upper end 650 of the arcuate-shaped slot 600K when tension is applied to the Bowden cable 614. Movement of the link pin 620 rotates the actuator cam 350 about the pivot shaft 618 which defines an axis of rotation 354A of the actuator cam 350. The arcuate-shaped slot 600K defines a range of motion of the actuator cam 350. When tension is removed from the Bowden cable 614, the upward spring bias 644 on the dual plunger 358 rotates the actuator cam 350 about the axis of rotation 354A repositioning the link pin 620 towards a lower end 652 of the arcuate-shaped slot 600K. The actuator cam 350 is in a home rotational position 380 when the link pin 620 abuts the lower end 652 of the arcuate-shaped slot 600K.

The loop latch release system 32' is shown in FIG. 23 in an unactuated condition 340 with the actuator cam 350 in the home rotational position 380, the dual plunger 358 in a retracted position 384, and the loop latch 28 in a locked position 180. In addition, the link pin 620 abuts the lower end 652 of the arcuate-shaped slot 600K. The guides 634 are positioned near an upper end 654 of the guide slots 600H, 600H'. Referring to FIG. 24, in the unactuated condition 340, the plunger engagement pads 514 of the first and second release plungers 440, 448 are spaced apart from the associated trigger engagement pads 312A, 312B of the latch retainer 286. Also shown in FIGS. 23 and 24, loops 292 projecting from the latch retainer 286 are in a locked position 180 with respect to the locking tabs 270, 272, 278C of the upper channel 130 and the fixed long rail 22.

As shown in FIG. 23, the actuator cam 350 includes a cam surface 388 having a contact point 390 with the dual plunger 358. The contact point 390 between the dual plunger 358 and the cam surface 388 defines the current rotational position of the actuator cam 350. The contact point 390 is aligned with a home position 414A of the actuator cam 350 in FIG. 23. The cam surface 388 extends between a first end 388A and a second end 388B. Different portions 400, 404 of the cam surface 388 are brought into contact with the dual plunger 358 as the actuator cam 350 is rotated by the Bowden cable 614. Thus, the contact point 390 between the cam surface 388 and the dual plunger 358 is repositioned along different portions 400, 404 of the cam surface 388 as the actuator cam 350 is rotated. For purposes of describing the relative motions of the actuator cam 350 with respect to resulting movements of the dual plunger 358 and the loop latch 28, the cam surface 388 is demarcated into a home position 414A, a first transition zone 400 extending between the home position 414A and an initial contact position 414B, and a second transition zone 404 extending between the initial contact position 414B and a latch release position 414C. The latch release position 414C is generally aligned with or near the second end 388B of the cam surface 388. The home position 414A may be aligned with, adjacent to, and/or offset from the first end 388A of the cam surface 388 without altering the scope of the invention.

Referring to FIG. 23, the cam surface 388 has an increased radial distance from the axis of rotation 354A at the latch release position 414C than the radial distance from the axis of rotation 354A at the home position 414A. The difference in radial distance between the cam surface 388 and the axis of rotation 354A between the home position 414A and the latch release position 414C is converted into vertical movement of the dual plunger 358 as the actuator cam 350 is rotated. As such, the cam surface 388 can be adjusted to result in a desired amount of vertical motion of the actuator cam 350.

When the loop latch release system 32' is in the unactuated condition 340 shown in FIG. 23, a latch release operation is initiated by applying tension to the Bowden cable 614. The tension in the Bowden cable 614 rotates the link pin 620 towards the upper end 650 of the arcuate-shaped slot 600K which rotates the actuator cam 350 in a clockwise direction 418, as viewed in FIG. 23. As the actuator cam 350 is rotated in the clockwise direction 418, the contact point 390 between the dual plunger 358 and the cam surface 388 moves along the cam surface 388 through the first transition zone 400 and the second transition zone 404.

Figure 25:
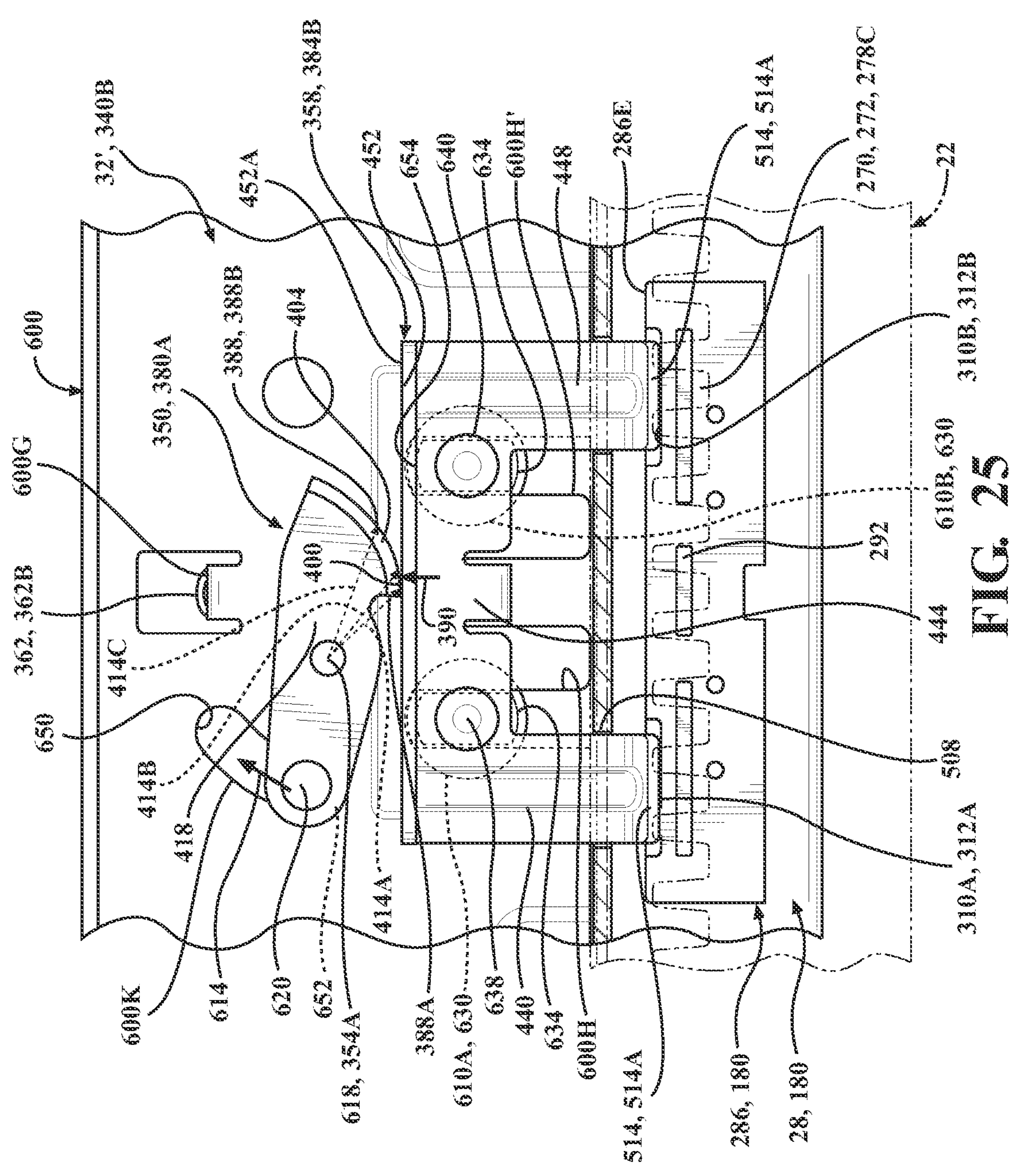
FIG. 25 shows a fragmentary cross-sectional view of the long rail assembly of FIG. 24, showing the loop latch release system in a transition condition, a dual plunger in an initial contact position, and the loop latch in the locked position.
Figure 26:
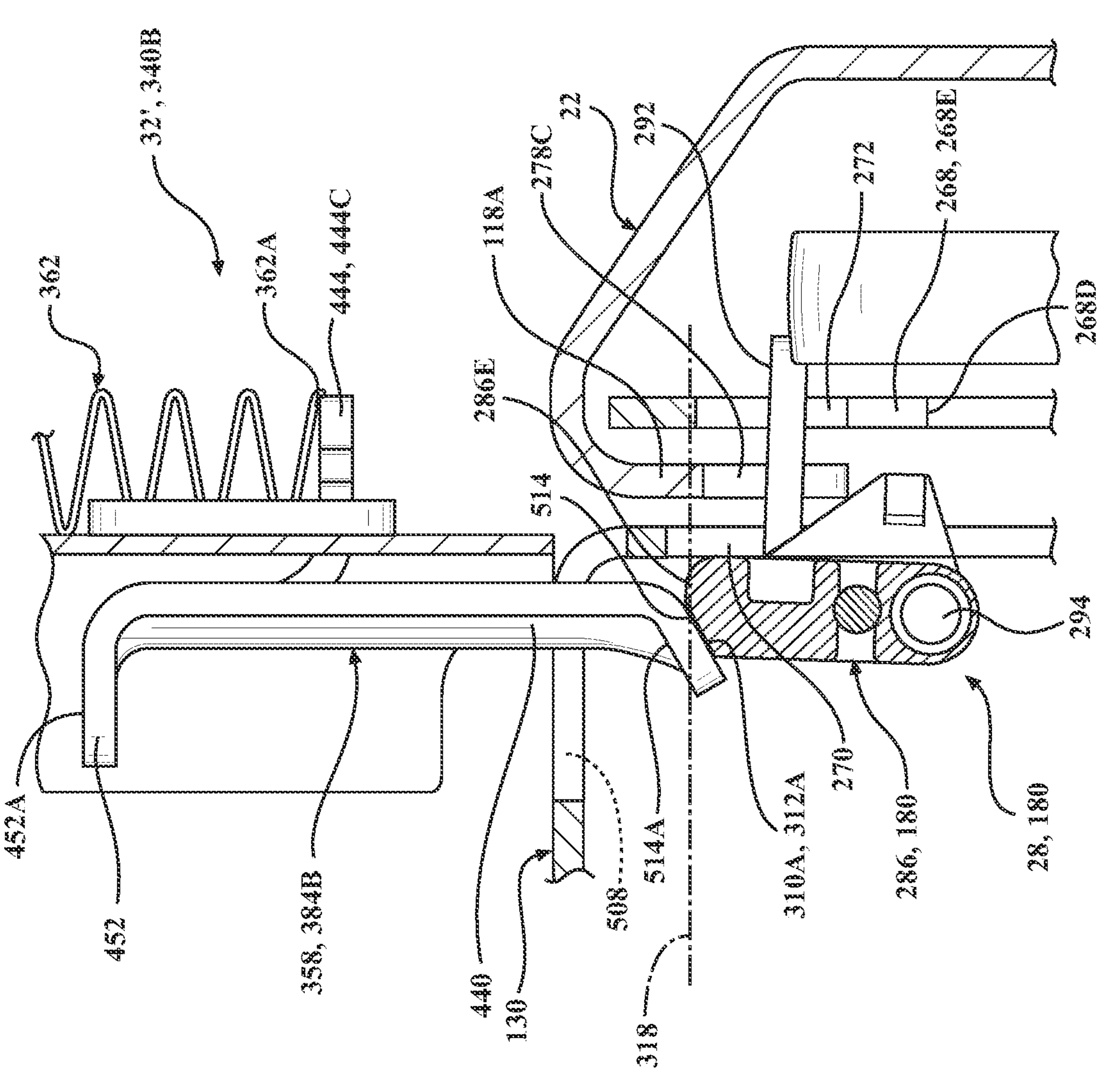
FIG. 26 shows a fragmentary cross-sectional end view of the long rail assembly of FIG. 25, showing the loop latch release system in the transition condition, the dual plunger in the initial contact position, and the loop latch in the locked position.

The loop latch release system 32' is shown in the transition condition 340B in FIGS. 25 and 26 with the actuator cam 350 rotated such that the contact point 390 is aligned with the initial contact position 414B of the cam surface 388. The first and second release plungers 440, 448 are shown in contact with the trigger engagement pads 312A, 312B of the latch retainer 286 with the loop latch 28 in the locked position 180. In addition, the link pin 620 is shown spaced apart from both the lower end 652 and the upper end 650 of the arcuate-shaped slot 600K. Also shown, the guide 634 of each of the first and second plunger guides 610A, 610B is spaced apart from the upper end 654 of the associated guide slot 600H, 600H'.

Figure 27:
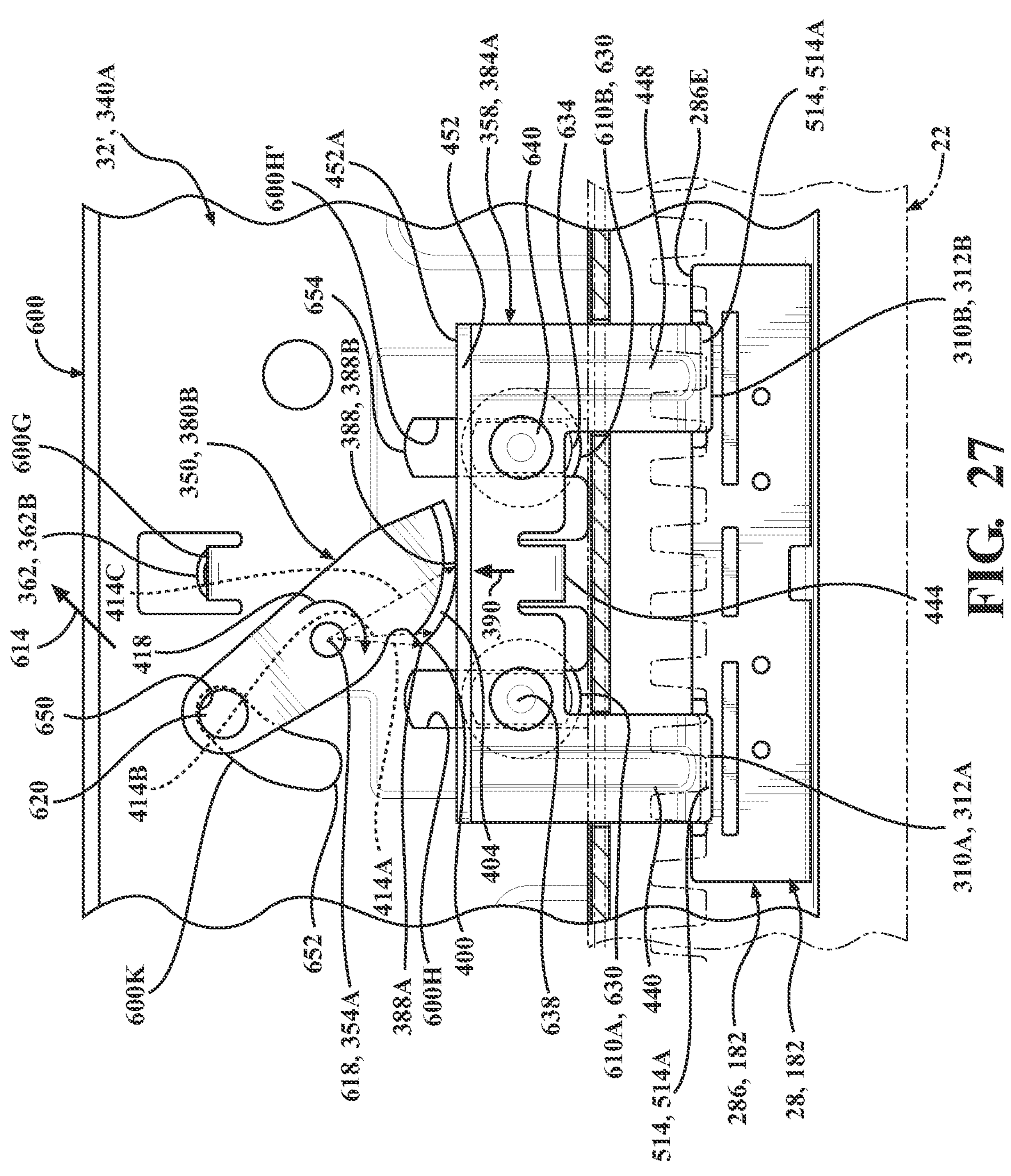
FIG. 27 shows a fragmentary cross-sectional view of the long rail assembly of FIG. 26, showing the loop latch release system in an actuated condition, the dual plunger in an extended position, and the loop latch in the unlocked position.
Figure 28:
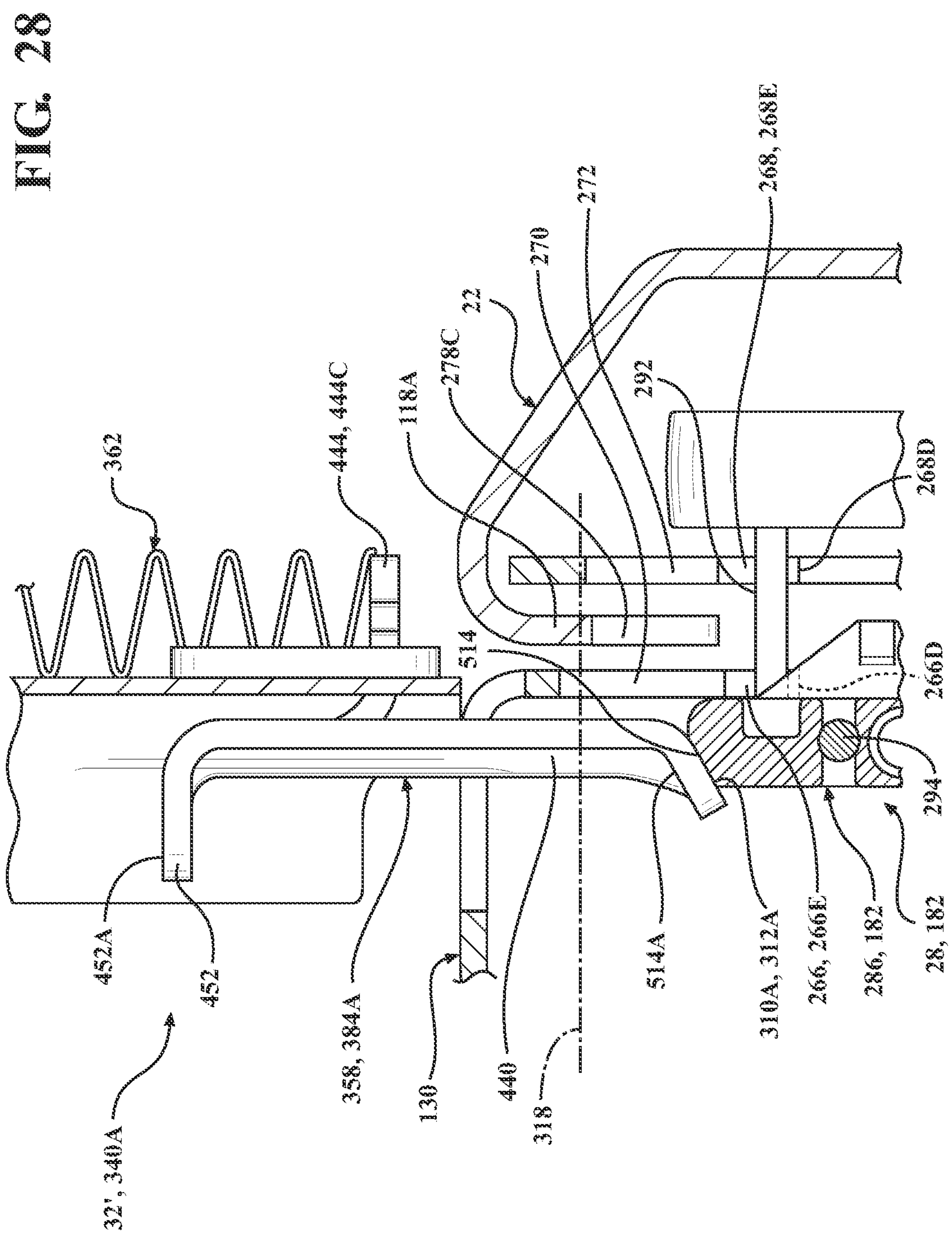
FIG. 28 shows a fragmentary cross-sectional end view of the long rail assembly of FIG. 27, showing the loop latch release system in the actuated condition, the dual plunger in the extended position, and the loop latch in the unlocked position.

Additional rotation of the actuator cam 350 by the Bowden cable 614 in the clockwise direction 418 results in the contact point 390 between the dual plunger 358 and the cam surface 388 being repositioned towards the latch release position 414C shown in FIGS. 27 and 28. Referring to FIG. 27, the loop latch release system 32' is shown in the actuated condition 340A with the actuator cam 350 in the latch release rotational position 380B, the dual plunger 358 in the extended position 384A, and the loop latch 28 in the unlocked position 182. In addition, the link pin 620 abuts the upper end 650 of the arcuate-shaped slot 600K. The contact point 390 between the dual plunger 358 and the actuator cam 350 is aligned with the latch release position 414C. Further, the guides 634 of the first and second plunger guides 610A, 610B are spaced apart from the upper end 654 of the guide slots 600H, 600H'. The plunger engagement pads 514 of the first and second release plungers 440, 448 of the dual plunger 358 are in frictional contact with the respective trigger engagement pads 312A, 312B of the latch retainer 286. The rotational movement of the actuator cam 350 has resulted in the dual plunger 358 applying downward load on the latch retainer 286, causing the latch retainer 286 to move downward.

As shown in FIG. 28, the downward movement of the latch retainer 286 repositioned the loops 292 into the gap 266E, 268E between the locking tabs 270, 272, 278C and the lower end surfaces 266D, 268D of the U-shaped slots 266, 268. As such, the loops 292 are disengaged from the locking tabs 270, 272, 278C in the upper channel 130 and the fixed long rail 22. The upper channel 130 can be repositioned along the fixed long rail 22 while the loops 292 are disengaged from the locking tabs 270, 272, 278C.

A latch relock operation is initiated when the loop latch release system 32' is in the actuated condition 340A shown in FIGS. 27 and 28 and the upper channel 130 is in the desired position 14' along the fixed lower rail 22. The loop latch release system 32' is retained in the actuated condition 340A while tension is applied to the Bowden cable 614. Releasing tension on the Bowden cable 614 initiates the latch relock operation. The spring 294 attached to the latch retainer 286 spring-biases the latch retainer 286 from the unlocked position 182 shown in FIG. 28 towards the locked position 180 shown in FIG. 24. As such, the spring 294 automatically repositions the loop latch 28 to the locked position 180.

In addition, the return spring 362 (shown in FIG. 22) biases the dual plunger 358 towards the retracted position 384 shown in FIG. 23. Upward movement of the dual plunger 358 presses on the actuator cam 350, causing the actuator cam 350 to rotate towards the home rotational position 380 shown in FIG. 23 with the link pin 620 abutting the lower end 652 of the arcuate-shaped slot 600K. The spring 294 attached to the latch retainer 286 and the return spring 362 coupled between the dual plunger 358 and the housing bracket 600 retain the loop latch 28 in the locked position 180 and the loop latch release system 32' in an unactuated condition 340 until tension is applied to the Bowden cable 614.

One benefit of the loop latch release system for the long rail assembly is that loop latch release system eliminates the direct coupling between the actuator cam and the release plunger. A second benefit is the loop latch release system has two points of contact between the release plunger and the loop latch to reduce rotation of the loop latch due to the engagement with the release plunger. A third benefit is the loop latch release system can accommodate an amount of component misalignment, tolerance stackup, and component dimensional variation while assuring proper functioning of the loop latch release system.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A rail drive assembly for a vehicle seat configured to travel along a fixed long rail, said rail drive assembly comprising:

- an upper channel configured to be transposable along said fixed long rail;
- a loop latch operatively coupled to said upper channel, said loop latch including a latch retainer having a first release trigger spaced apart from a second release trigger, said latch retainer repositionable between a locked position wherein said rail drive assembly is interlocked with said fixed long rail preventing movement of said rail drive assembly and an unlocked position wherein said rail drive assembly is transposable along said fixed long rail; and
- a loop latch release system operatively coupled to said upper channel, said loop latch release system comprising:
  - an actuator cam rotatable about an axis of rotation between a home rotational position and a latch release rotational position, and said actuator cam having a cam surface;
  - a dual plunger having a first plunger spaced apart from a second plunger with said first and second plungers projecting from a cross piece, said dual plunger repositionable between a retracted position wherein each of said first and second plungers is spaced apart from said latch retainer and an extended position wherein each of said first and second plungers is engaged with a respective one of said first and second release triggers; and
  - a return spring configured to spring-bias said cross piece of said dual plunger towards an engaged position defining a contact point between said cross piece and said cam surface of said actuator cam;
- wherein when said contact point is aligned with said home rotational position of said cam surface, rotating said actuator cam in a first rotational direction such that said contact point is aligned with said latch release rotational position of said cam surface repositions said dual plunger between said retracted position and said extended position; and wherein when said dual plunger is in said extended position, said first and second plungers engage and actuate said first and second release triggers moving said latch retainer to said unlocked position, and when said dual plunger is in said retracted position, said loop latch automatically locks with said fixed long rail.

2. The rail drive assembly as set forth in claim 1, wherein: said return spring repositions said dual plunger from said extended position towards said retracted position as said actuator cam is rotated in a second rotational direction from said latch release rotational position being aligned with said contact point with said second rotational direction being different from said first rotational direction.

3. The rail drive assembly as set forth in claim 2, wherein: each of said first and second plungers includes a respective first and second plunger engagement pad;

each of said first and second release triggers include a respective first and second trigger engagement pad; and each of said first and second plunger engagement pads configured to frictionally engage a respective one of said first and second trigger engagement pads as said dual plunger is repositioned between said retracted position and said extended position.

4. The rail drive assembly as set forth in claim 3, wherein: each of said first and second plungers defining a longitudinal axis; and each of said first and second plunger engagement pads being inclined with respect to said respective longitudinal axis.

5. The rail drive assembly as set forth in claim 4, wherein: said latch retainer having a vertical axis extending between opposing top and bottom surfaces of said latch retainer; and each of said first and second trigger engagement pads being inclined with respect to said vertical axis.

6. The rail drive assembly as set forth in claim 5, wherein: said cam surface includes a home position having a first radial distance from said axis of rotation and a latch release position having a second radial distance from said axis of rotation;

said home position being spaced apart from said latch release position and said first radial distance being less than said second radial distance;

said contact point being aligned with and frictionally engaged with said home position of said cam surface when said actuator cam is in said home rotational position; and said contact point being aligned with and frictionally engaged with said latch release position of said cam surface when said actuator cam is in said latch release rotational position.

7. The rail drive assembly as set forth in claim 6, wherein: said dual plunger is decoupled from said actuator cam.

8. The rail drive assembly as set forth in claim 7, wherein: said loop latch has one or more of a plurality of U-shaped loops, fingers, and pins configured to meshingly engage with a plurality of one or more of a slot, a tab, a hole, and a notch in said fixed long rail when said loop latch is interlocked with said fixed long rail.

9. The rail drive assembly as set forth in claim 8, wherein: said cam surface includes a dwell zone adjacent said latch release position;

said cross piece includes a cutout region providing clearance for rotation of the actuator cam in said first rotational direction while said contact point is aligned with and frictionally engaged with said dwell zone of said cam surface; and rotation of said actuator cam while said contact point is aligned with and frictionally engaged with said dwell zone of said cam surface retains said dual plunger in said extended position.

10. The rail drive assembly as set forth in claim 9, wherein:

said actuator cam is fixedly coupled to a drive shaft aligned with said axis of rotation of said actuator cam; and rotation of said drive shaft rotates said actuator cam.

11. The rail drive assembly as set forth in claim 10, wherein:

a side wall of said upper channel includes a guide slot extending between opposing first and second sides of said side wall;

said latch retainer includes a T-shaped protrusion having a base portion projecting from a main portion of said latch retainer and a head portion extending from said base portion; and wherein said base portion is configured to slide along said guide slot when said main portion of said latch retainer is adjacent said first side of said side wall and said head portion is adjacent said second side of said side wall.

12. The rail drive assembly as set forth in claim 11, wherein:

said dual plunger includes an alignment boss; and said dual plunger is contained and supported by a housing, said housing including an alignment channel configured to matingly engage with said alignment boss.

13. The rail drive assembly as set forth in claim 8, wherein:

said rail drive assembly includes a housing bracket fixedly coupled to said upper channel, said housing bracket including first and second guide slots;

said actuator cam is rotationally coupled to said housing bracket; and said dual plunger fixedly coupled to spaced apart first and second plunger guides is slidably coupled to respective first and second guide slots in said housing bracket.

14. The rail drive assembly as set forth in claim 13, wherein:

said actuator cam is rotated by a Bowden cable.

15. The rail drive assembly as set forth in claim 14, wherein:

said return spring is operatively coupled between said housing bracket and said dual plunger; and said return spring biases said dual plunger towards said retracted position.

16. The rail drive assembly as set forth in claim 15, including:

a link pin projecting from said actuator cam spaced apart from said axis of rotation of said actuator cam, said link pin having a distal end passing through an arcuate-shaped slot in said housing bracket, and said Bowden cable is fixedly coupled to said distal end of said link pin; and wherein said arcuate-shaped slot defines a rotational range of motion of said actuator cam.

* * * * *